(12) United States Patent
Amundson et al.

(10) Patent No.: US 10,655,873 B2
(45) Date of Patent: May 19, 2020

(54) CONTROLLER INTERFACE WITH SEPARATE SCHEDULE REVIEW MODE

(71) Applicant: Ademco Inc., Golden Valley, MN (US)

(72) Inventors: John B. Amundson, Plymouth, MN (US); Gabriel A. Bergman, St. Louis Park, MN (US); Brent D. Vick, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 137 days.

(21) Appl. No.: 15/498,955

(22) Filed: Apr. 27, 2017

(65) Prior Publication Data
US 2017/0227245 A1 Aug. 10, 2017

Related U.S. Application Data

(63) Continuation of application No. 13/247,618, filed on Sep. 28, 2011, now abandoned, which is a
(Continued)

(51) Int. Cl.
*F24F 11/00* (2018.01)
*G05B 19/042* (2006.01)
(Continued)

(52) U.S. Cl.
CPC .............. *F24F 11/30* (2018.01); *F24F 11/62* (2018.01); *G05B 19/0426* (2013.01);
(Continued)

(58) Field of Classification Search
CPC .. F24F 11/30; F24F 11/62; F24F 11/61; F24F 11/64; G05B 19/0426; G05B 2219/2614
See application file for complete search history.

(56) References Cited

U.S. PATENT DOCUMENTS

| 4,079,366 A | 3/1978 | Wong |
| 4,174,807 A | 11/1979 | Smith et al. |

(Continued)

FOREIGN PATENT DOCUMENTS

| DE | 3334117 A1 | 4/1985 |
| EP | 0434926 B1 | 8/1995 |

(Continued)

OTHER PUBLICATIONS

"CorAccess Systems/In Home,"http://web.archive.org/web20011212084427/www.coraccess.com/home.html, 1 page, copyright 2001, printed Aug. 19, 2004.
(Continued)

*Primary Examiner* — Charles R Kasenge
(74) *Attorney, Agent, or Firm* — Shumaker & Sieffert, P.A.

(57) ABSTRACT

A controller equipped with a user interface having a separate schedule review mode, including methods of accessing and/or programming such devices, are disclosed. The controller may include a user interface that can be utilized to initiate a scheduling routine having a separate schedule review mode for displaying one or more schedule parameters of the controller without initiating the editing mode. An illustrative method of accessing a schedule on a controller coupled to a user interface may include the steps of initializing a scheduling routine within the controller, initiating a schedule review mode within the controller, displaying one or more schedule parameters for at least one period on the user interface, and exiting the scheduling routine. One or more of the schedule parameters can be modified, if desired, by initiating a separate editing mode within the controller.

15 Claims, 33 Drawing Sheets

Related U.S. Application Data continuation of application No. 12/720,571, filed on Mar. 9, 2010, now Pat. No. 8,239,067, which is a continuation of application No. 10/725,826, filed on Dec. 2, 2003, now Pat. No. 7,706,923.

(51) Int. Cl.
   *F24F 11/30* (2018.01)
   *F24F 11/62* (2018.01)
   *F24F 11/64* (2018.01)
   *F24F 11/61* (2018.01)

(52) U.S. Cl.
   CPC ............... *F24F 11/61* (2018.01); *F24F 11/64* (2018.01); *G05B 2219/2614* (2013.01)

(56) References Cited

U.S. PATENT DOCUMENTS

| | | | |
|---|---|---|---|
| 4,206,872 | A | 6/1980 | Levine |
| 4,224,615 | A | 9/1980 | Penz |
| 4,264,034 | A | 4/1981 | Hyltin et al. |
| 4,298,946 | A | 11/1981 | Hartsell et al. |
| 4,308,991 | A | 1/1982 | Peinetti et al. |
| 4,337,822 | A | 7/1982 | Hyltin et al. |
| 4,382,544 | A | 5/1983 | Stewart |
| 4,386,649 | A | 6/1983 | Hines et al. |
| 4,388,692 | A | 6/1983 | Jones et al. |
| 4,431,134 | A | 2/1984 | Hendricks et al. |
| 4,442,972 | A | 4/1984 | Sahay |
| 4,446,913 | A | 5/1984 | Krocker |
| 4,479,604 | A | 10/1984 | Didner |
| 4,506,827 | A | 3/1985 | Jamieson et al. |
| 4,606,401 | A | 8/1986 | Levine et al. |
| 4,621,336 | A | 11/1986 | Brown |
| 4,622,544 | A | 11/1986 | Bially et al. |
| 4,717,333 | A | 1/1988 | Carignan |
| 4,725,001 | A | 2/1988 | Carney et al. |
| 4,819,714 | A | 4/1989 | Otsuka et al. |
| 4,837,731 | A | 6/1989 | Levine et al. |
| 4,881,686 | A | 11/1989 | Mehta |
| 4,918,439 | A | 4/1990 | Wozniak et al. |
| 4,948,040 | A | 8/1990 | Kobayashi et al. |
| 4,992,779 | A | 2/1991 | Sugino et al. |
| 4,997,029 | A | 3/1991 | Otsuka et al. |
| 5,012,973 | A | 5/1991 | Dick et al. |
| 5,038,851 | A | 8/1991 | Mehta |
| 5,053,752 | A | 10/1991 | Epstein et al. |
| 5,065,813 | A | 11/1991 | Berkeley et al. |
| 5,086,385 | A | 2/1992 | Launey et al. |
| 5,088,645 | A | 2/1992 | Bell |
| 5,140,310 | A | 8/1992 | DeLuca et al. |
| 5,161,606 | A | 11/1992 | Berkeley et al. |
| 5,170,935 | A | 12/1992 | Federspiel et al. |
| 5,181,653 | A | 1/1993 | Foster et al. |
| 5,230,482 | A | 7/1993 | Ratz et al. |
| 5,238,184 | A | 8/1993 | Adams |
| 5,251,813 | A | 10/1993 | Kniepkamp |
| 5,259,445 | A | 11/1993 | Pratt et al. |
| 5,329,991 | A | 7/1994 | Mehta et al. |
| 5,348,078 | A | 9/1994 | Dushane et al. |
| 5,386,577 | A | 1/1995 | Zenda |
| 5,482,209 | A | 1/1996 | Cochran et al. |
| 5,526,422 | A | 6/1996 | Keen |
| 5,537,106 | A | 7/1996 | Mitsuhashi |
| 5,566,879 | A | 10/1996 | Longtin |
| 5,570,837 | A | 11/1996 | Brown et al. |
| 5,673,850 | A | 10/1997 | Uptegraph |
| 5,782,296 | A | 7/1998 | Mehta |
| 5,818,428 | A | 10/1998 | Eisenbrandt et al. |
| 5,873,519 | A | 2/1999 | Beilfuss |
| 5,886,697 | A | 3/1999 | Naughton et al. |
| 5,901,183 | A | 5/1999 | Garin et al. |
| 5,902,183 | A | 5/1999 | D'Souza |
| 5,937,942 | A | 8/1999 | Bias et al. |
| 5,947,372 | A | 9/1999 | Tiernan |
| 6,020,881 | A | 2/2000 | Naughton et al. |
| 6,032,867 | A | 3/2000 | Dushane et al. |
| 6,059,195 | A | 5/2000 | Adams et al. |
| 6,081,197 | A | 6/2000 | Garrick et al. |
| 6,121,875 | A | 9/2000 | Hamm et al. |
| 6,140,987 | A | 10/2000 | Stein et al. |
| 6,192,282 | B1 | 2/2001 | Smith et al. |
| 6,196,467 | B1 | 3/2001 | Dushane et al. |
| 6,208,331 | B1 | 3/2001 | Singh et al. |
| 6,236,326 | B1 | 5/2001 | Murphy |
| 6,259,074 | B1 | 7/2001 | Brunner et al. |
| 6,285,912 | B1 | 9/2001 | Ellison et al. |
| 6,290,140 | B1 | 9/2001 | Pesko et al. |
| 6,315,211 | B1 | 11/2001 | Sartain et al. |
| 6,318,639 | B1 | 11/2001 | Toth |
| 6,330,806 | B1 | 12/2001 | Beaverson et al. |
| 6,344,861 | B1 | 2/2002 | Naughton et al. |
| 6,351,693 | B1 | 2/2002 | Monie et al. |
| 6,398,118 | B1 | 6/2002 | Rosen et al. |
| 6,478,233 | B1 | 11/2002 | Shah |
| 6,502,758 | B2 | 1/2003 | Cottrell |
| 6,518,957 | B1 | 2/2003 | Lehtinen et al. |
| 6,578,770 | B1 | 6/2003 | Rosen |
| 6,580,950 | B1 | 6/2003 | Johnson et al. |
| 6,581,846 | B1 | 6/2003 | Rosen |
| 6,595,430 | B1 | 7/2003 | Shah |
| 6,619,555 | B2 | 9/2003 | Rosen |
| 6,621,507 | B1 | 9/2003 | Shah |
| 6,783,079 | B2 | 8/2004 | Carey et al. |
| 6,786,421 | B2 | 9/2004 | Rosen |
| 6,789,739 | B2 | 9/2004 | Rosen |
| 6,824,069 | B2 | 11/2004 | Rosen |
| 6,833,990 | B2 | 12/2004 | LaCroix et al. |
| 6,886,754 | B2 | 5/2005 | Smith et al. |
| 6,967,565 | B2 | 11/2005 | Lingemann |
| 6,983,889 | B2 * | 1/2006 | Alles ................... F24F 3/0442 236/49.1 |
| 7,001,495 | B2 | 2/2006 | Essalik et al. |
| 7,050,026 | B1 | 5/2006 | Rosen |
| 7,114,554 | B2 | 10/2006 | Bergman et al. |
| 7,130,719 | B2 * | 10/2006 | Ehlers ................... G06Q 10/10 700/276 |
| 7,152,806 | B1 | 12/2006 | Rosen |
| 7,156,318 | B1 | 1/2007 | Rosen |
| 7,302,642 | B2 | 11/2007 | Smith et al. |
| 7,320,110 | B2 | 1/2008 | Shah |
| 7,360,717 | B2 | 4/2008 | Shah |
| 7,661,603 | B2 * | 2/2010 | Yoon ................... F24F 11/30 236/51 |
| 7,706,923 | B2 | 4/2010 | Amundson et al. |
| 8,239,067 | B2 | 8/2012 | Amundson et al. |
| 2001/0029585 | A1 | 10/2001 | Simon et al. |
| 2001/0042684 | A1 | 11/2001 | Essalik et al. |
| 2001/0048030 | A1 | 12/2001 | Sharood et al. |
| 2001/0052459 | A1 | 12/2001 | Essalik et al. |
| 2002/0005435 | A1 | 1/2002 | Cottrell |
| 2002/0016639 | A1 | 2/2002 | Smith et al. |
| 2002/0092779 | A1 | 7/2002 | Essalik et al. |
| 2003/0034897 | A1 | 2/2003 | Shamoon et al. |
| 2003/0034898 | A1 | 2/2003 | Shamoon et al. |
| 2003/0121652 | A1 | 7/2003 | Carey et al. |
| 2003/0123224 | A1 | 7/2003 | LaCroix et al. |
| 2003/0142121 | A1 | 7/2003 | Rosen |
| 2003/0150927 | A1 | 8/2003 | Rosen |
| 2004/0074978 | A1 | 4/2004 | Rosen |
| 2004/0107717 | A1 * | 6/2004 | Yoon ................... F24F 11/30 62/230 |
| 2004/0133314 | A1 * | 7/2004 | Ehlers ................... G06Q 10/10 700/276 |
| 2004/0182941 | A1 * | 9/2004 | Alles ................... F24F 3/0442 236/49.3 |
| 2004/0245352 | A1 | 12/2004 | Smith |
| 2004/0262410 | A1 | 12/2004 | Hull |
| 2010/0162111 | A1 | 6/2010 | Amundson et al. |
| 2012/0022701 | A1 | 1/2012 | Amundson et al. |

(56) References Cited

U.S. PATENT DOCUMENTS

FOREIGN PATENT DOCUMENTS

| EP | 0678204 B1 | 3/2000 |
|---|---|---|
| EP | 0985994 A1 | 3/2000 |
| EP | 1074009 B1 | 3/2002 |
| WO | 9711448 A1 | 3/1997 |
| WO | 97/39392 A1 | 10/1997 |
| WO | 0043870 A2 | 7/2000 |
| WO | 0152515 A1 | 7/2001 |
| WO | 0179952 A1 | 10/2001 |
| WO | 0193779 A1 | 12/2001 |

OTHER PUBLICATIONS

"HAI Company Background," http://www.homeauto.com/AboutHAI/abouthai_main_htm, 2 pages, printed Aug. 19, 2004.
"High-tech options take hold in new homes—08-28-200—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls for AudioNideo, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control, Installation, Start-Up, and Operating Instructions," pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to Apr. 21, 2005.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.

(56) References Cited

OTHER PUBLICATIONS

White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, prior to Jul. 7, 2004.
Hunter, "44300144350," Owner's Manual, 35 pages, prior to Jul. 7, 2004.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, 2004. pp. 1-28, prior to Jul. 7, 2004.
Lennox, "Network Control Panel (NCP)," User's Manual, 18 pages, Nov. 1999.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.
NN:"VITODENS, VITOPLUS—mit Regulung fur witterungsgefuhrten Betrieb and menugefuhrter Bedienungseinheit Comfortrol, Bedienungsanleitung fur den Anlagenbetreiber" Mar. 2003, Viessmann, Allendorf, XP002320590Retrieved from the Internet: URL: http://www.viessmann.de/web/germany/tdis_endv.nsf/a8363d62fec7daa4c1256ddb002770.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100, 24 pages, Apr. 2001.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100FM, 23 pages, Nov. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.

(56) References Cited

OTHER PUBLICATIONS

Totaline, "Instructions P/N P474-1010", Manual, 2 pages, Dec. 1998.
Viessmann, "Vitodens 222, Model WS2, Vitodens 200, Model WB2, Vitoplus 300, Model VP3, Operating Instructions for the System Operator," 32 pages, Mar. 2003.
"A Full Range of Alternative User Interfaces for Building Occupants and Operators," http://www.automatedbuildings.com/news/janOO/articles/andover/andover.htm, 5 pages, dated Jan. 2000, printed Sep. 20, 2004.
Totaline, "Programmable Thermostat Configurable for Advanced Heat Pump or Dual Fuel Operation," Owner's Manual PIN P374-1500, 24pages, Jun. 1999.
Prosecution History from U.S. Appl. No. 10/725,826, dated Sep. 28, 2005 through Mar. 11, 2013, 273 pp.
Prosecution History from U.S. Appl. No. 12/720,571, dated Oct. 5, 2010 through Apr. 11, 2012, 73 pp.
Prosecution History from U.S. Appl. No. 13/247,618, dated Jul. 30, 2014 through May 5, 2017, 135 pp.
Invensys Deluxe Programmable Thermostats 9700, 9701, 9715, 9720, User's Manual, first date of access prior to Dec. 2, 2003, 21 pages.
"HTI News Release," http://www.hometoys.com/htinews/apr99/releases/ha1 0 1.htm, 3 pages, Apr. 1999.

\* cited by examiner

CONTROLLER INTERFACE WITH SEPARATE SCHEDULE REVIEW MODE

This application is a continuation of U.S. patent application Ser. No. 13/247,618, filed Sep. 28, 2011 and entitled CONTROLLER INTERFACE WITH SEPARATE SCHEDULE REVIEW MODE, which is a continuation of U.S. patent application Ser. No. 12/720,571, filed Mar. 9, 2010 and entitled CONTROLLER INTERFACE WITH SEPARATE SCHEDULE REVIEW MODE, now U.S. Pat. No. 8,239,067, which is a continuation of U.S. patent application Ser. No. 10/725,826, filed Dec. 2, 2003, entitled CONTROLLER INTERFACE WITH SEPARATE SCHEDULE REVIEW MODE, now U.S. Pat. No. 7,706,923, all of which are incorporated hereby by reference.

FIELD OF THE INVENTION

The present invention relates generally to the field of programmable controllers for homes and/or buildings and their related grounds. More specifically, the present invention relates to controller interfaces for such controllers having a separate schedule review mode.

BACKGROUND OF THE INVENTION

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

In a typical HVAC application, for example, such controllers can be employed to monitor and, if necessary, control various environmental conditions occurring within a home or office building. The controller may include a microprocessor that interacts with other components in the system to regulate the temperature, humidity, venting, and/or air quality occurring at one or more locations. An internal sensor located within the controller and/or one or more remote sensors may be employed to sense when the temperature and/or humidity level reaches a certain threshold level, causing the controller to send a signal to activate or deactivate one or more components in the system.

The controller may be equipped with a user interface that allows the user to monitor and adjust various parameters of the controller. With more modern designs, the user interface typically comprises a liquid crystal display (LCD) or light emitting diode (LED) display inset within a controller housing that contains a microprocessor or the like, an I/O interface, and other components of the controller. The user interface may include a menu-driven interface that allows the user to scroll through one or more menus or screens to adjust the different settings on the controller. In some cases, a routine programmed within the controller prompts the user at each menu or screen to input various commands into the interface to adjust the controller settings.

In certain designs, the user interface can be configured to permit the user to program the controller to run on a certain schedule. For example, the controller can include a scheduling routine that allows the user to adjust the heat and cool set points for one or more periods during a particular day in order to conserve energy. To view the parameters for the schedule, many controllers require the user to initiate an editing mode within the controller, causing the controller to display the parameters for the selected day and/or period along with prompts for modifying the parameters. Within the editing mode, the user can scroll through the various schedule parameters and, if desired, modify the schedule according to the user's needs or preferences. After the user has finished viewing the current settings and has made any desired modifications to the schedule, the user can then send a signal to the controller to either save the modified parameters in memory, or terminate the scheduling routine and discard any changes made.

Because many controllers require the user to initialize an editing mode in order to display the current schedule parameters, users are often wary of interacting with the interface. The user may fear making inadvertent changes or canceling the schedule altogether by pressing the wrong button on the interface while the controller is in the editing mode. In some cases, the user may be concerned with interfering with the normal operation of the controller, or with modifying other controller settings. As such, there is a need in the art to provide a controller having a user interface that allows the user to display the current scheduling parameters without the risk or fear of accidental schedule modification.

SUMMARY OF THE INVENTION

The present invention pertains to controllers having a separate schedule review mode. In one illustrative embodiment, a method of accessing a schedule in a controller equipped with a user interface may include the steps of: initializing a scheduling routine within the controller having a separate schedule review mode and editing mode, initiating the schedule review mode within the controller, displaying one or more schedule parameters on the user interface, and exiting the scheduling routine. In some embodiments, the editing mode can be initiated at any time during the scheduling routine, including after the schedule review mode has been initiated, or directly from the controller's normal operation mode by bypassing the schedule review mode altogether.

The controller may include a user interface that can be used for both displaying and modifying various parameters within the controller. For example, the user interface can include a touch screen, display panel/keypad, or any other suitable device adapted to transmit various commands to and from the controller. A number of mechanical and/or soft buttons may be configured to accept input commands from the user. In certain embodiments, the user interface can include a menu-driven interface that allows the user to navigate through one or more menus or screens to modify various operational settings within the controller. The menu-driven interface may include a number of icons (e.g. descriptive buttons) prompting the user to input various commands with, for example, the touch screen or keypad. In certain embodiments, the controller can include a separate schedule review mode that allows the user to access and view the schedule parameters without the risk or fear of accidental schedule modification.

DETAILED DESCRIPTION OF THE INVENTION

The following description should be read with reference to the drawings, in which like elements in different drawings are numbered in like fashion. The drawings, which are not necessarily to scale, depict illustrative embodiments and are not intended to limit the scope of the invention. Although examples of various programming and operational steps are illustrated in the various views, those skilled in the art will recognize that the many of the examples provided have suitable alternatives that can be utilized. While the various devices, systems and methods illustrated herein are described specifically with respect to HVAC controllers, it should be understood that the present invention can be employed in other applications where schedules are implemented, including, for example, security systems, lighting systems, sprinkler or drip water systems, audio/video (A/V) systems, etc.

Figure 1:
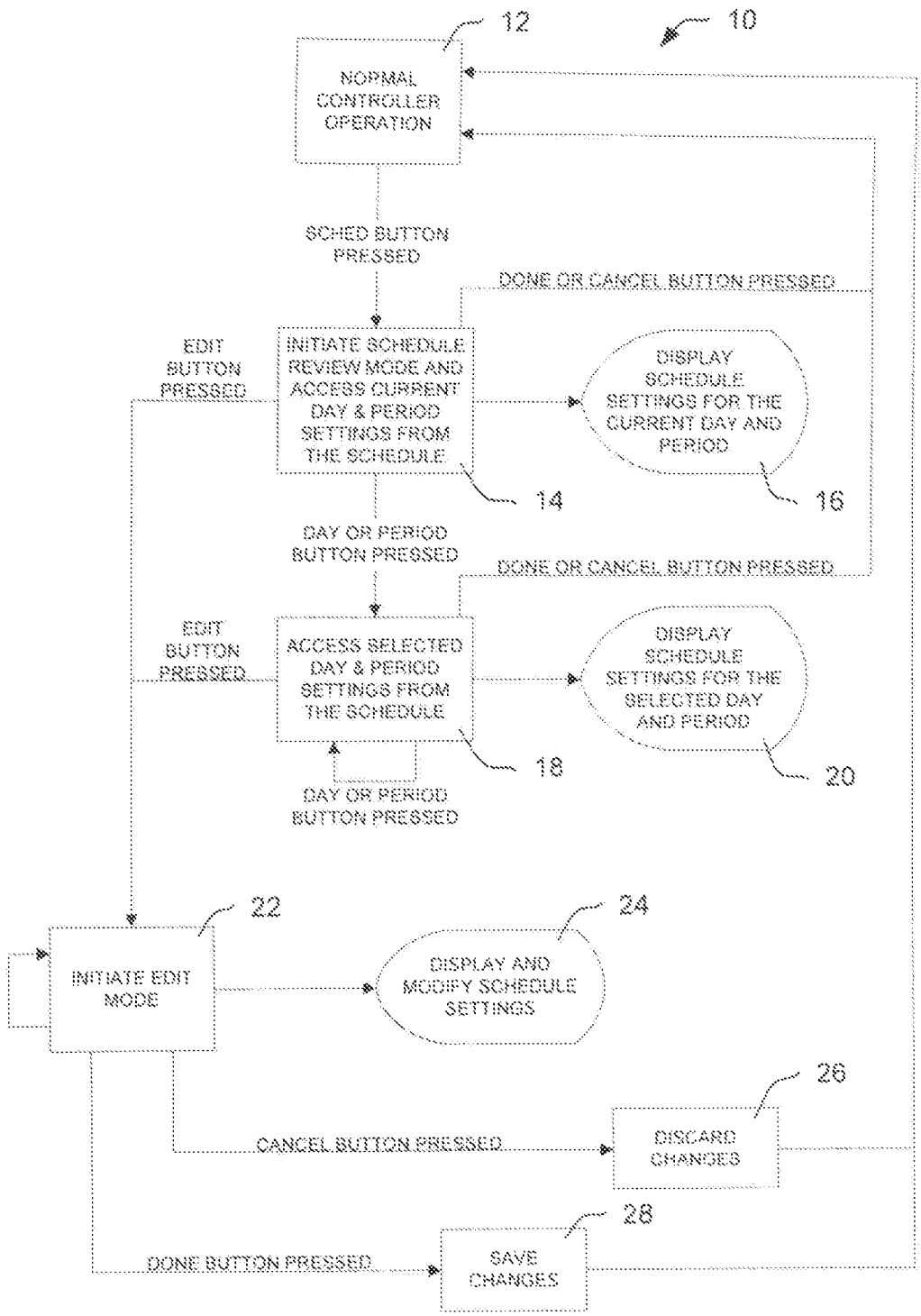
FIG. 1 is a flow chart of an illustrative method for accessing and programming a schedule on a controller equipped with a user interface.

Referring now to FIG. 1, a flow chart showing an illustrative method of viewing a schedule programmed within a controller equipped with a user interface is shown. As shown in FIG. 1, the method, indicated generally by reference number 10, can begin with the step of initializing a scheduling routine within the controller that allows the user to view and, if desired, modify one or more parameters within a schedule. In an illustrative HVAC system for use in a home, for example, the controller can be configured to initialize a scheduling routine that allows the user to view and modify one or more periods during the day corresponding with the times during the day that the user wakes, leaves home, returns home, and sleeps. For example, the controller may include a separate "wake" period, "leave" period, "return" period, and "sleep" period that can be programmed within the schedule to conserve energy while the user is away from home or asleep.

Within each period, the controller can include various event time and set point parameters that can be utilized to regulate various environmental conditions within a particular space. In certain embodiments, for example, the controller may include a heat set point parameter and cool set point parameter that can be utilized to regulate the amount of heating and/or cooling occurring within the home. The controller may further include a fan mode parameter that can be set to operate the fan in a particular manner during each period. For example, the controller can be configured to operate the fan constantly during each selected period (i.e. an "On Mode") or automatically as needed (i.e. an "Auto Mode") during each selected period. Other parameters such as the humidity level, frost level, air quality, etc. may also be regulated via the controller. The particular parameter(s) regulated by the controller will, of course, vary depending on the type of system in which the device is employed.

As will be described in greater detail below, the scheduling routine can include a separate schedule review mode that allows the user to display one or more of the schedule parameters on the user interface without having to initiate an editing mode within the controller. The inclusion of a separate review mode allows the user to view the current schedule stored in memory without the risk of inadvertently modifying or canceling the current schedule settings.

From a normal controller operation mode indicated generally by block 12, the user may initialize a scheduling routine within the controller that allows the user to view the current schedule parameters stored in memory, and, if desired, modify one or more of the parameters to create a new schedule. To initialize the scheduling routine, the user may send a request to the controller via the user interface, causing the controller to initiate a schedule review mode that displays the current settings on the user interface. Initialization of the schedule review mode may occur, for example, when the user presses a button on a touch screen or keypad, speaks a command, or otherwise sends a signal to the controller.

When the schedule review mode is initiated, the controller can be configured to access and display the current day and period settings for the schedule via the user interface, as indicated generally by blocks 14 and 16. For example, if the current time and day is 7:00 AM on Wednesday, the controller can be configured to display the "wake" period parameters for Wednesday upon initiating the schedule review mode.

To view other selected days and/or periods within the current schedule, the user may select each day and/or period, causing the controller to access and display the parameters for the selected day and/or period, as indicated generally by blocks 18 and 20. The user can select each day individually within the schedule review mode to view the schedule parameters for each period without modification. If, for example, the user is currently viewing the parameters for Wednesday during the "wake" period, the user can select other individual days within the week (e.g. Tuesday) to view the schedule parameters for that day's "wake" period. Within each individual day selected, the user can select each period to display the parameters scheduled to occur for that day. At any point during the schedule review mode, the user can send a signal to the controller to terminate the scheduling routine and return to the normal controller operation mode indicated by block 12.

To modify one or more of the schedule parameters, the user can initiate an editing mode within the controller, as indicated generally by block 22. The user can initiate the editing mode by, for example, pressing an "edit" button on a touch screen, keypad or other input device, sending a signal to the controller to initiate the editing mode.

Upon initiation of the editing mode, the user interface can be configured to display a message that prompts the user to select the day or days that are to be modified in the schedule. As the first day is selected, the various periods in the schedule are then displayed on the user interface, as indicated generally by block 24. At this step, the user may select one or more days during the week to modify the schedule. For example, the user may select to run the schedule on alternating days of the week, during only the weekdays or weekends, or any other desired combination. The controller can be configured to notify the user of each day or combination of days selected using, for example, a check mark, blinking text, or suitable indicator on the user interface.

The controller interface can be configured to default to one of the periods upon selecting the first day, displaying the schedule parameters for that particular day and period on the user interface. For example, if the user selects Monday as the first day to modify in the schedule, the controller can be configured to display the parameters for the "wake" period on the user interface. In certain embodiments, the controller can be configured to default to the period last modified in the schedule, or to the period following the last period modified in the schedule.

Once the user has selected one or more days to be modified, the user can then modify one or more of the parameters for each selected period, as desired, causing the controller to display the new parameters on the user interface. At any time during this process, the user may assign/ un-assign the schedule parameters to/from additional days of the week. If desired, the user may choose to cancel the modified parameters by hitting a "cancel" button or other similar command on the user interface, causing the controller to terminate the schedule routine and discard the modified parameters, as indicated generally by block 26

After the user has finished modifying the schedule, the user can send a signal to the controller to save the modified settings, as indicated generally by block 28. Once the modified schedule parameters have been saved, the controller can be configured to terminate the scheduling routine and revert to the normal controller operation mode indicated by block 12. Once saved, the controller can be configured to automatically run the modified schedule.

Figure 2:
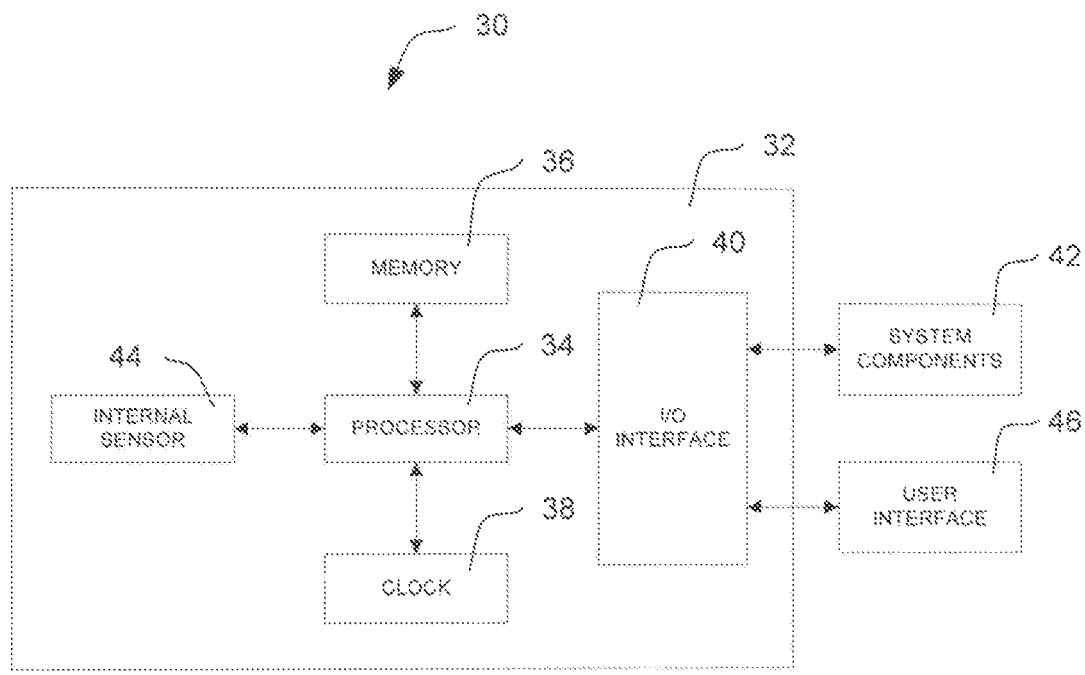
FIG. 2 is a block diagram of an illustrative HVAC system employing a controller having a separate schedule review mode.

FIG. 2 is a block diagram of an illustrative HVAC system 30 employing a controller 32 having a separate schedule review mode and editing mode. The illustrative controller 32 includes a processor 34 (e.g. a microprocessor/CPU), a storage memory 36, a clock 38, and an I/O interface 40 that electrically connects the controller 32 to other system components 42. In an illustrative HVAC system for use in a home, for example, controller 32 can be electrically connected to an air conditioner unit, a heater unit, and/or a humidifier/dehumidifier unit that can be selectively activated or deactivated to regulate the temperature and humidity levels within the structure. Other components such as a filtration unit, a UV lamp, a defroster, a flue damper, and/or a ventilator (including Energy Recovery Ventilator "ERV") can also be connected to the controller 32, as desired. An internal sensor 44 may be located within the controller 32, and can be employed to constantly measure the temperature and/or humidity levels occurring within the structure. In certain designs, the controller 32 can include one or more remote sensors configured to measure the temperature and humidity levels outside of the home, or at other locations apart from the controller 32.

The controller 32 can be equipped with a user interface 46 that can be used to transmit signals to and from the controller 32. The user interface 46 can include a touch screen, LCD panel and keypad, computer (e.g. a PDA), or any other suitable device for sending and receiving signals to and from the controller 32. In certain embodiments, the user interface 46 may include a menu-driven interface that allows the user to cycle through one or more menus or screens to view and, if desired, modify various operational settings within the controller 32. For example, the controller 32 can be preprogrammed to run separate routines for adjusting the current temperature or humidity levels, changing the clock or date settings on the controller 32, setting a vacation mode that can be used while the user is away, or checking the status of the various system components connected to the controller 32. The menus or screens corresponding to a particular routine can be organized from general to more specific, providing the user with only pertinent information at each step during the routine.

Figure 3:
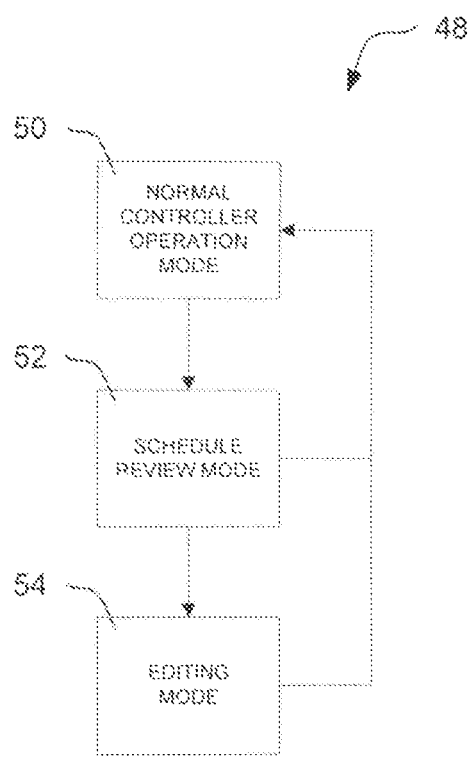
FIG. 3 is a flow chart showing an illustrative scheduling routine for a controller having a separate schedule review mode.

FIG. 3 is a flow chart showing an illustrative scheduling routine 48 for a controller having a separate schedule review mode. As shown in FIG. 3, the scheduling routine 48 may begin with a normal controller operation mode 50. From the normal controller operation mode 50, the user can initiate a schedule review mode 52 within the controller, causing the controller to access the schedule parameters stored in memory and display them on the user interface. In this mode, the controller can be configured to allow the user to browse the various schedule parameters programmed in controller without the risk of accidental modification or cancellation of the schedule. From the schedule review mode, the user may either terminate the scheduling routine, causing the controller to revert to the normal controller operation mode 50, or initiate an editing mode 54 to modify one or more of the schedule parameters. Once finished viewing and/or modifying the schedule parameters, the controller can be configured to revert back to the normal controller operation mode 50.

Figure 4:
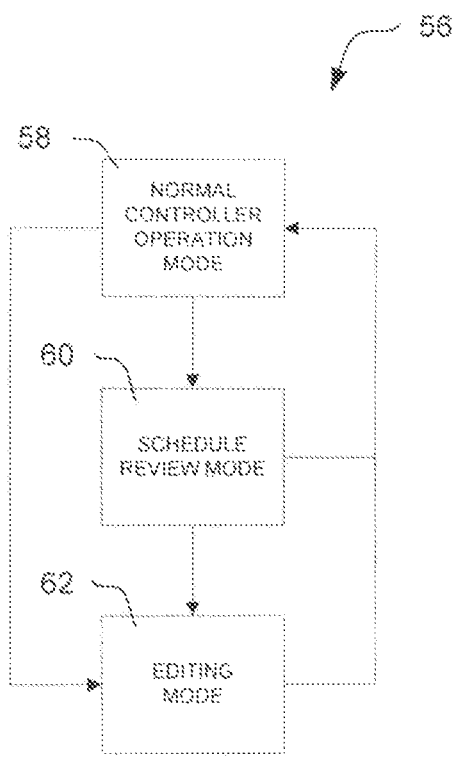
FIG. 4 is a flow chart showing another illustrative schedule routine for a controller having a separate schedule review mode.

In an alternative scheduling routine 56 illustrated in FIG. 4, the controller can be configured to permit the user to bypass the schedule review mode 60 and initiate the editing mode 62 directly from the normal controller operation mode 58. As shown in FIG. 4, for example, the user may either initiate a schedule review mode 60 within the controller to view the various schedule parameter programmed in the current schedule, or bypass the schedule review mode 60 and initiate the editing mode 62 directly from normal controller operation mode 58.

Figure 5:
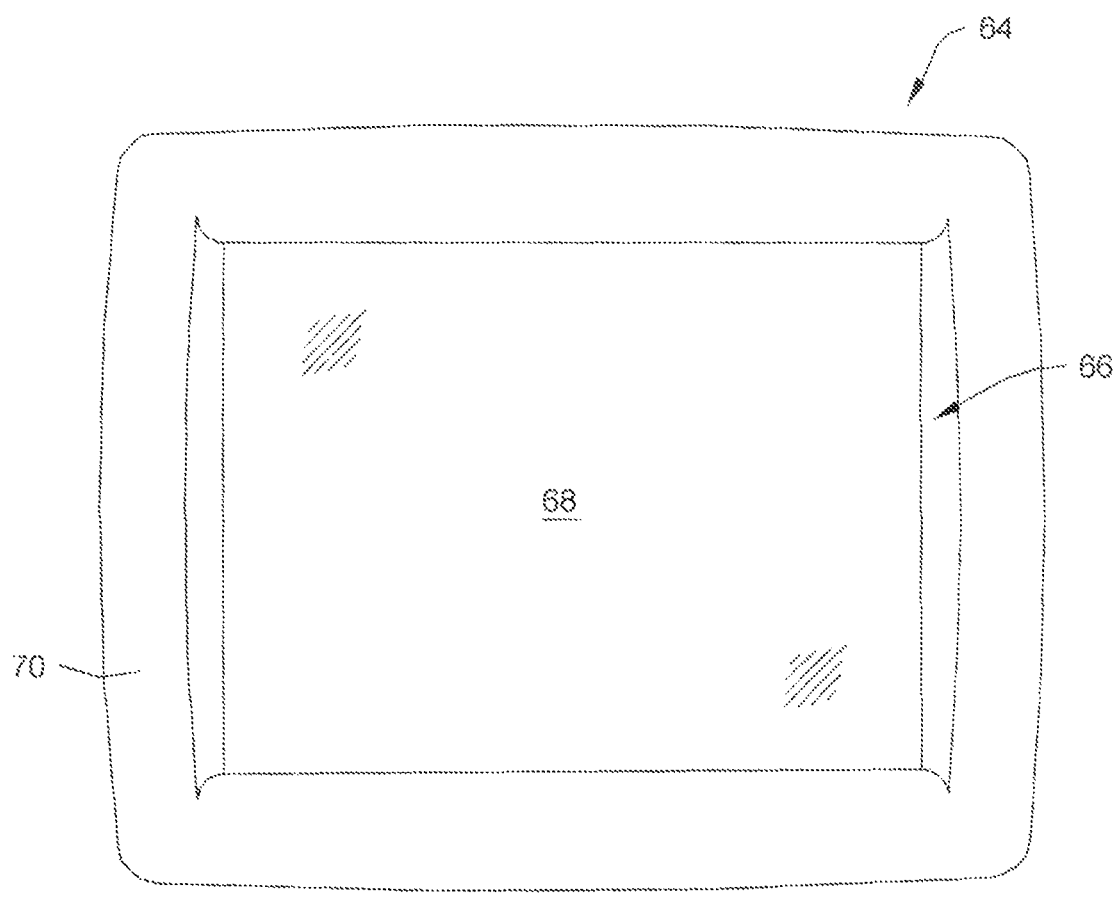
FIG. 5 is a plan view of an illustrative HVAC controller equipped with a touch screen interface.

FIG. 5 is a plan view illustrating an exemplary HVAC controller 64 equipped with a user interface 66 having a separate schedule review mode. As shown in FIG. 5, the interface 64 can include a touch screen 68 configured to display information and transmit signals to and from the controller 64. Some examples of suitable touch screens 68 for use with the controller 64 may include resistive, capacitive, infrared, or surface acoustic wave (SAW) type touch screens. While the touch screen 68 of FIG. 5 is shown inset or recessed within a controller housing 70, other configurations are possible. In some embodiments, the touch screen 68 may be provided as a separate element for use with a personal digital assistant (PDA), PC computer, or other remote device. In certain embodiments, the touch screen 68 can be provided as a part of an LCD panel, CRT, or other suitable display device.

FIGS. 6A-6M illustrate pictorial views showing an illustrative method of accessing and programming a schedule using the controller 64 and user interface 66 of FIG. 5. In a first view depicted in FIG. 6A, the controller 64 can be configured to display a main menu screen on the touch screen 68, providing the user with basic information about the current operational status of the controller 64. The main menu screen may be the default screen that appears on the touch screen 68 when the controller 64 is initially activated, after a loss of power has occurred, or after no activity has been detected by the user interface 66 for a certain period of time (e.g. after 1 minute of non-activity).

In the illustrative embodiment, the controller 64 is configured to display a current inside temperature parameter 72

(in either ° F. or ° C.), a current outside temperature parameter 74 (in either ° F. or ° C.), a time of day parameter 76, and a day of week parameter 78 on the touch screen 68. The current heat/cool set point parameter 80 may also be displayed on the touch screen 68, indicating the temperature at which the controller 64 is currently set to maintain. An alphanumeric message 82 displayed on the touch screen 68 may be provided to inform the user whether the controller 64 is currently following the schedule.

A set of up/down buttons 84 displayed on the touch screen 68 can be pressed, if desired, to temporarily change the current heat/cool set point parameter 80 to a setting different from that contained in the schedule. A fan mode button 86 and system mode button 88 displayed on the touch screen 68 allow the user to view and, if desired, modify the fan and system settings. For example, and in the illustrative embodiment, the fan mode button 86 can be pressed repeatedly to cycle the fan between an "On Mode", "Intermittent Mode", and "Auto Mode", allowing the user to control the operation of the fan. In similar fashion, the system mode button 88 can be pressed repeatedly to cycle the controller 64 through various heating and cooling modes, as desired.

A "SCHED" button 90 located on the touch screen 68 can used to initialize a scheduling routine within the controller 64 to access and/or modify one or more parameters within the current schedule. When the "SCHED" button 90 is pressed, the controller 64 can be configured to initiate a schedule review mode, causing the controller 64 to access the current schedule parameters and display them on the touch screen 68. As shown in FIG. 6B, for example, the controller 64 can be configured to access the event time parameter 92, heat set point parameter 94, and cool set point parameter 96 for the current schedule, and then display these parameters as alphanumeric text on the touch screen 68.

In the illustrative embodiment, a series of buttons 98 located on the top of the touch screen 68 correspond to the days of the week, and can be pressed to send a signal to the controller 64 to display the schedule parameters for each individual day in the schedule. An icon, blinking text or other suitable indicator for informing the user the current day selected may be displayed on the touch screen 68. For example, in the pictorial view illustrated in FIG. 6B, an icon 100 (e.g. check mark) may be displayed on the touch screen 68, informing the user that the schedule parameters for Wednesday are currently being displayed.

The controller 64 can be configured to default to the current day of the week when the schedule review mode is initiated. For example, if the current time and day is 7:00 AM on Wednesday, the controller 64 can be configured to display the "wake" period parameters for Wednesday on the touch screen 68. To view the schedule parameters for other days of the week, the user may press the appropriate day button 98 on the touch screen 68, causing the controller 64 to display the corresponding parameters for that selected day.

Within each selected day, the user may press one or more period buttons on the touch screen 68, causing the controller 64 to display the parameters scheduled for that day. The touch screen 68 may include, for example, a "WAKE" button 102, a "LEAVE" button 104, a "RETURN" button 106, and a "SLEEP" button 108 that correspond to a separate "wake" period, "leave" period, "return" period, and "sleep" period programmed in the controller 64. In the pictorial view depicted in FIG. 6B, for example, the "LEAVE" button 104 has been pressed (indicated generally by bold), causing the controller 64 to display the event time parameter 92 (i.e. 8:00 AM), heat set point parameter 94 (i.e. 62° F.) and cool set point parameter 96 (i.e. 85° F.) corresponding to the "leave" period.

While four periods are specifically illustrated in FIG. 6, it should be understood that the controller 64 could be programmed for a greater or lesser number of periods, if desired. The number of periods will, of course, vary depending on the particular application in which the controller 64 is employed.

To view the parameters for another period within the selected day, the user may press the appropriate button 102, 104, 106, 108 on the interface 64, causing the controller 64 to access the parameters for the selected period and display them on the interface 64. For example, as can be seen in FIGS. 6C-6E, the user may cycle from the "leave" period depicted in FIG. 6B to the "wake" period (FIG. 6C), "return" period (FIG. 6D), and then the "sleep" period (FIG. 6E) to view the schedule parameters 92, 94, 96 for each of these periods. At each screen displayed on the touch screen 68, the controller 64 can be configured to notify the user which period is currently being viewed by blinking the text for the appropriate button (as indicated generally by bolded text in FIGS. 6B-6E).

If the user desires to view the settings for a different day, the user may press the appropriate day button 98 on the touch screen 68, causing the controller 64 to display the parameters for the selected day. As shown in FIGS. 6E-6F, for example, pressing the "MON" button 98 on the touch screen 68 while the controller 64 is currently displaying the schedule parameters for the "sleep" period on Wednesday (see FIG. 6E), causes the controller 64 to display the event time parameter (i.e. 10:00 PM), heat set point parameter 94 (i.e. 65° F.), and cool set point parameter 96 (i.e. 77° F.) for Monday. In similar fashion, the user can cycle through the "sleep" parameters for other individual days by selecting the appropriate button 98 on the touch screen 68.

Figure 6A:
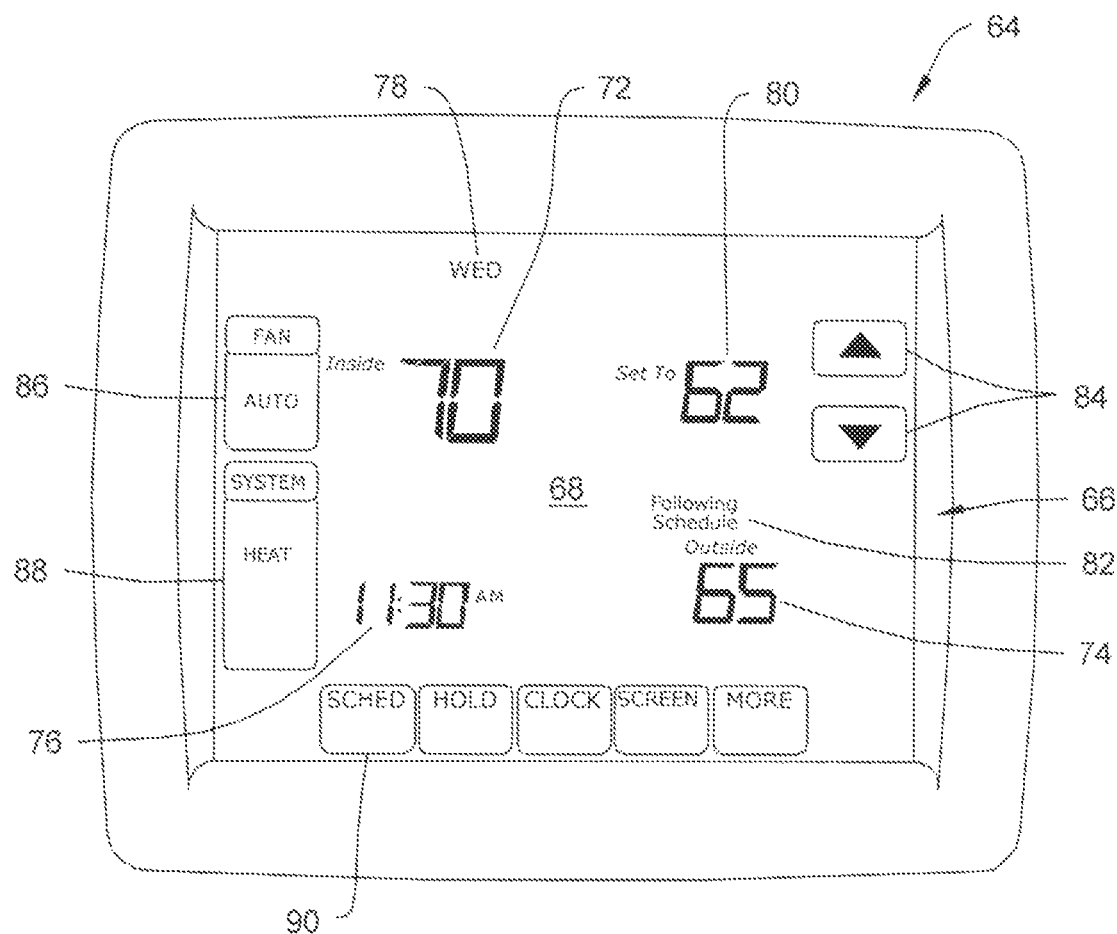
FIGS. 6A-6N are pictorial views showing an illustrative method of accessing and programming a schedule using the touch screen interface of FIG. 5.
Figure 6B:
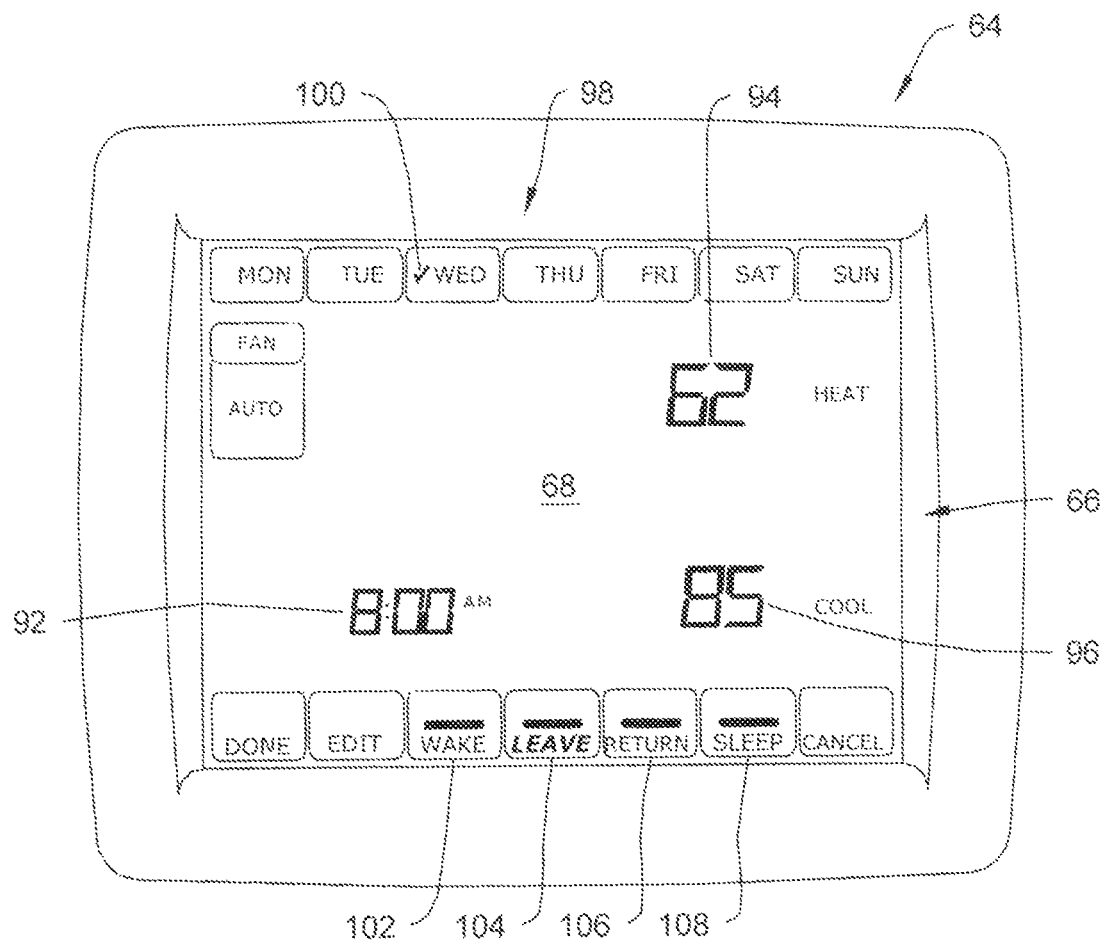
Figure 6C:
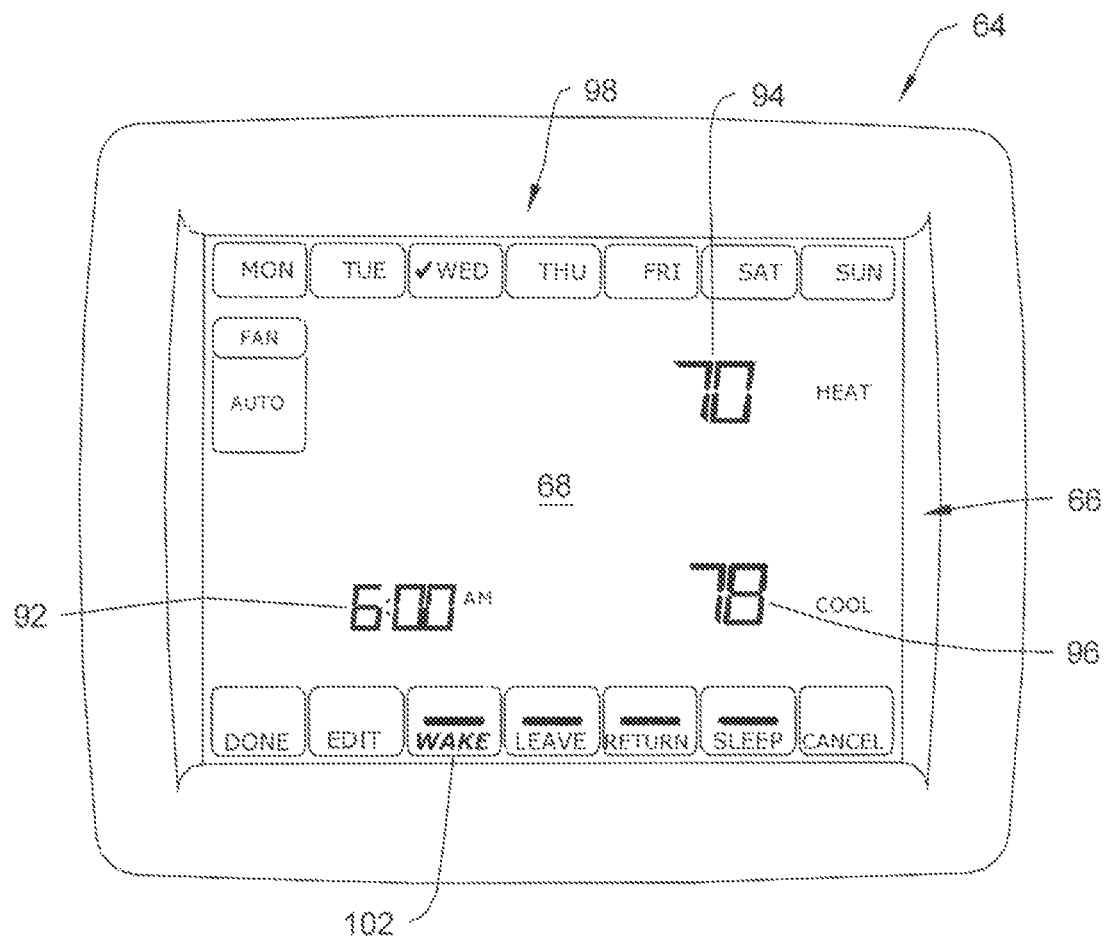
Figure 6D:
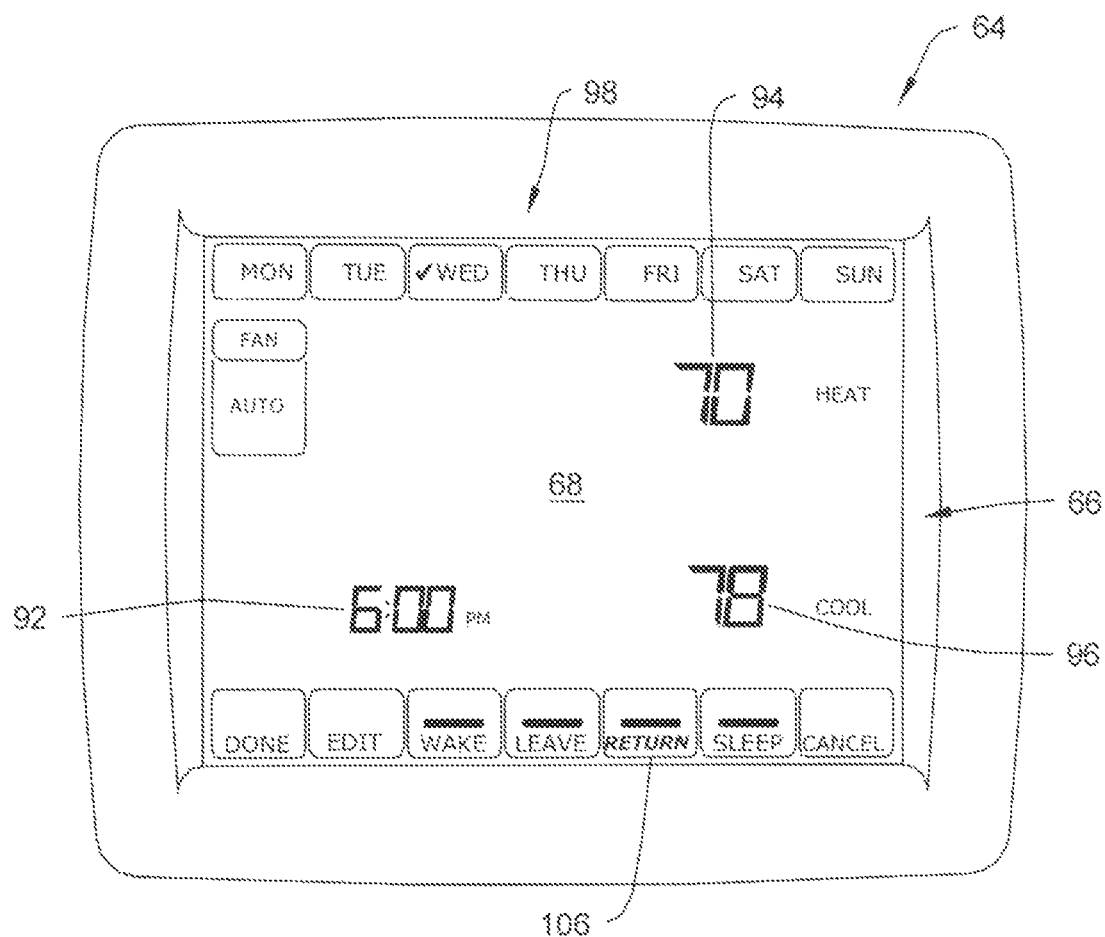
Figure 6E:
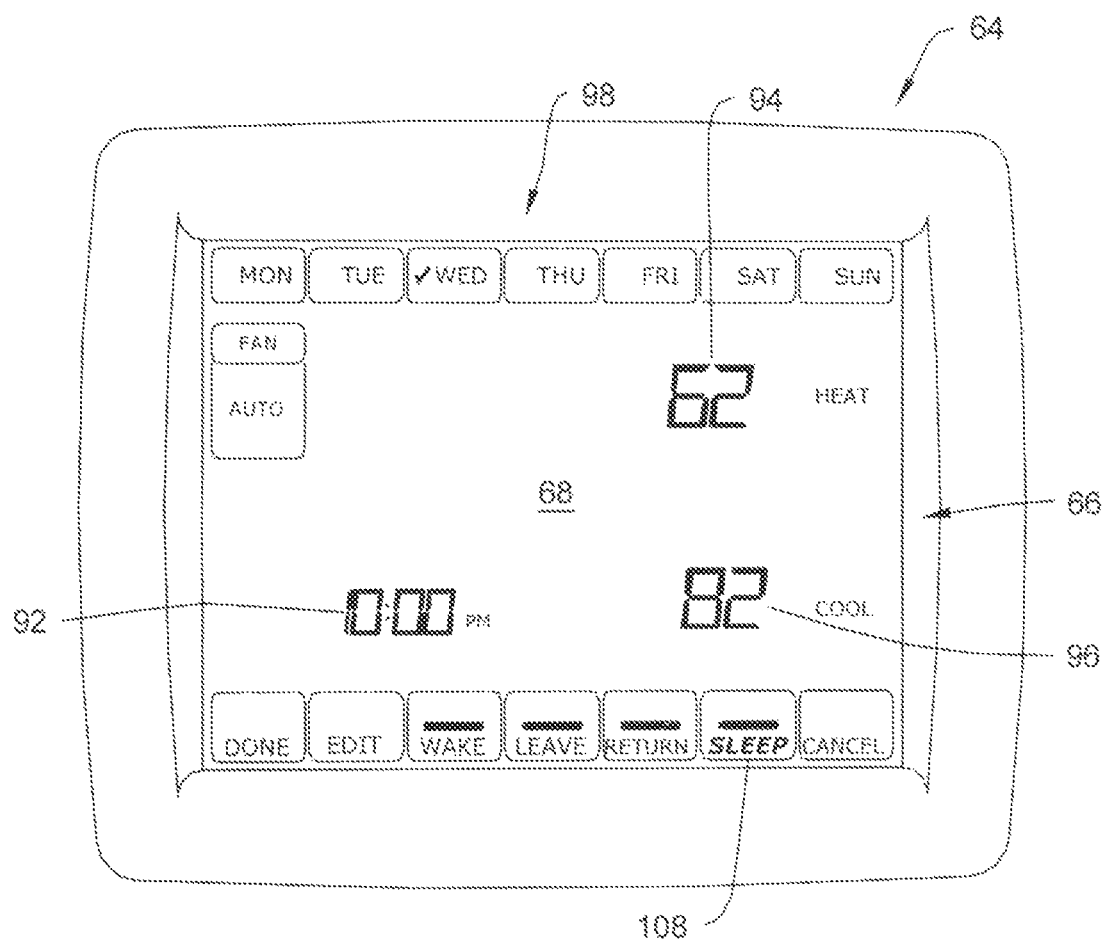
Figure 6F:
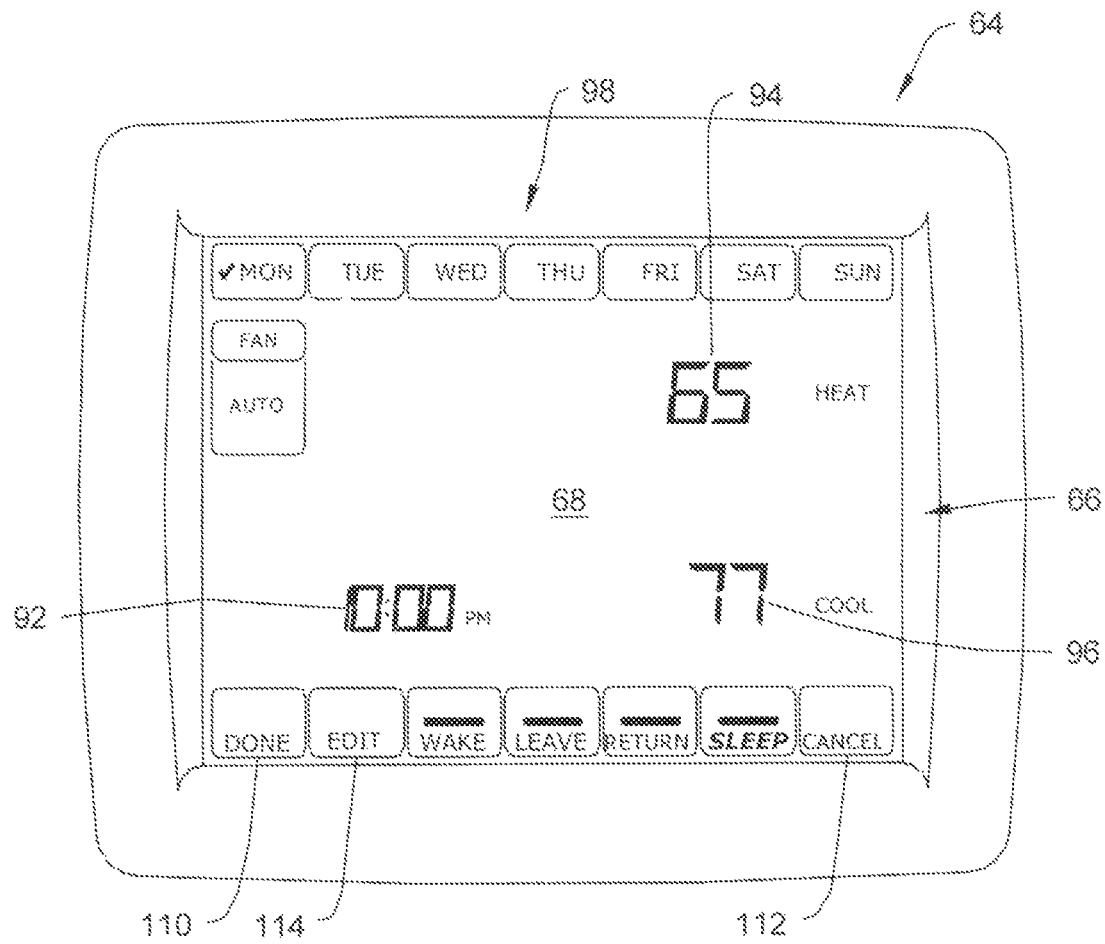

Once the user has finished viewing the desired schedule parameters for each day and/or period, the user can terminate the schedule review mode by pressing a "DONE" button 110 or "CANCEL" button 112 displayed on the touch screen 68, causing the controller 64 to terminate the scheduling routine and return to the main menu screen of FIG. 6A.

Figure 6G:
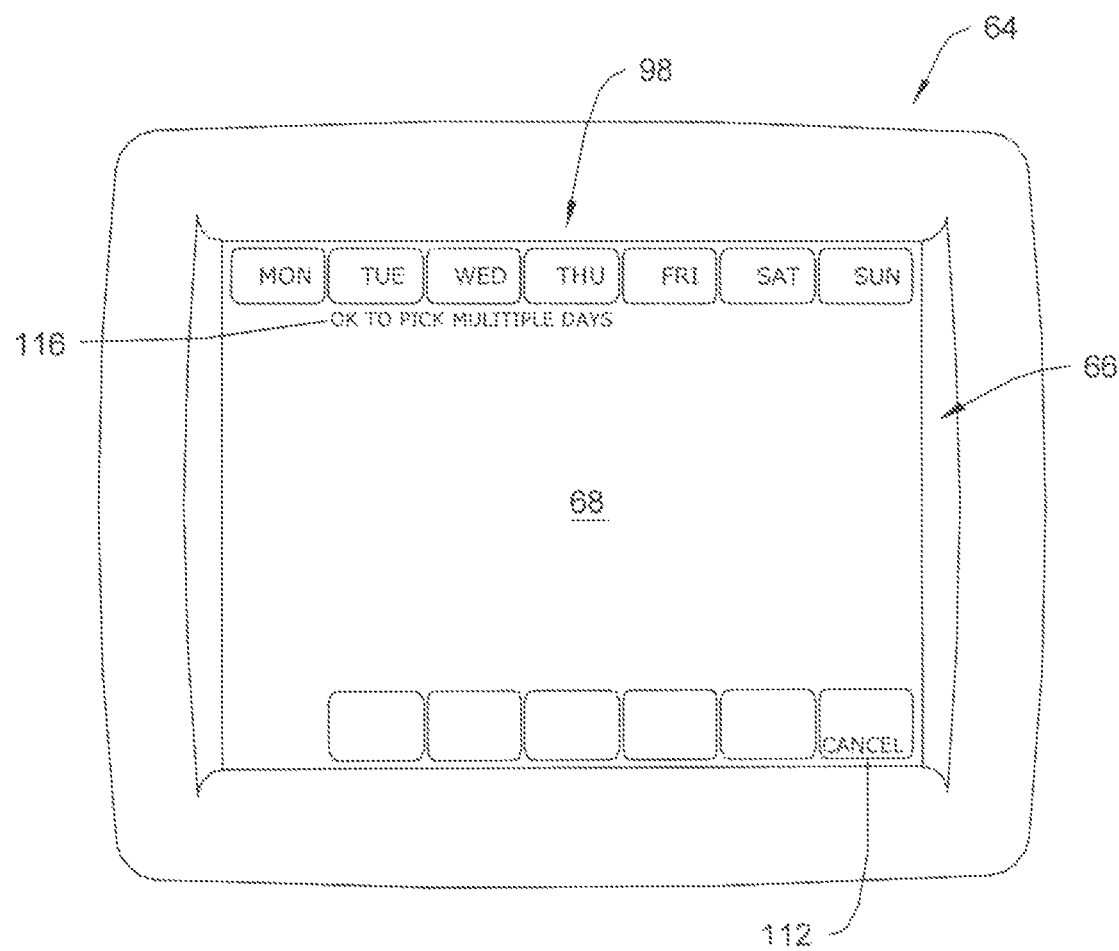

To modify one or more parameters in the schedule, the user can initiate an editing mode within the controller 64 by pressing an "EDIT" button 114 on the touch screen 68. As shown in FIG. 6G, for example, if the user presses the "EDIT" button 114, an alphanumeric message 116 stating, for example "OK TO PICK MULTIPLE DAYS" can appear on the touch screen 68, informing the user that multiple days can be selected. Other message variations may appear in addition to, or in lieu of, the alphanumeric message 116 illustrated in FIG. 6G. For example, the controller 64 can be configured to display the text "PLEASE SELECT AT LEAST ONE DAY TO MODIFY" or other similar message on the touch screen 68. The user can then either select one or more days to modify the schedule using the appropriate day button(s) 98, or press the "CANCEL" button 112 to terminate the scheduling routine and return to the main menu screen of FIG. 6A.

Figure 6H:
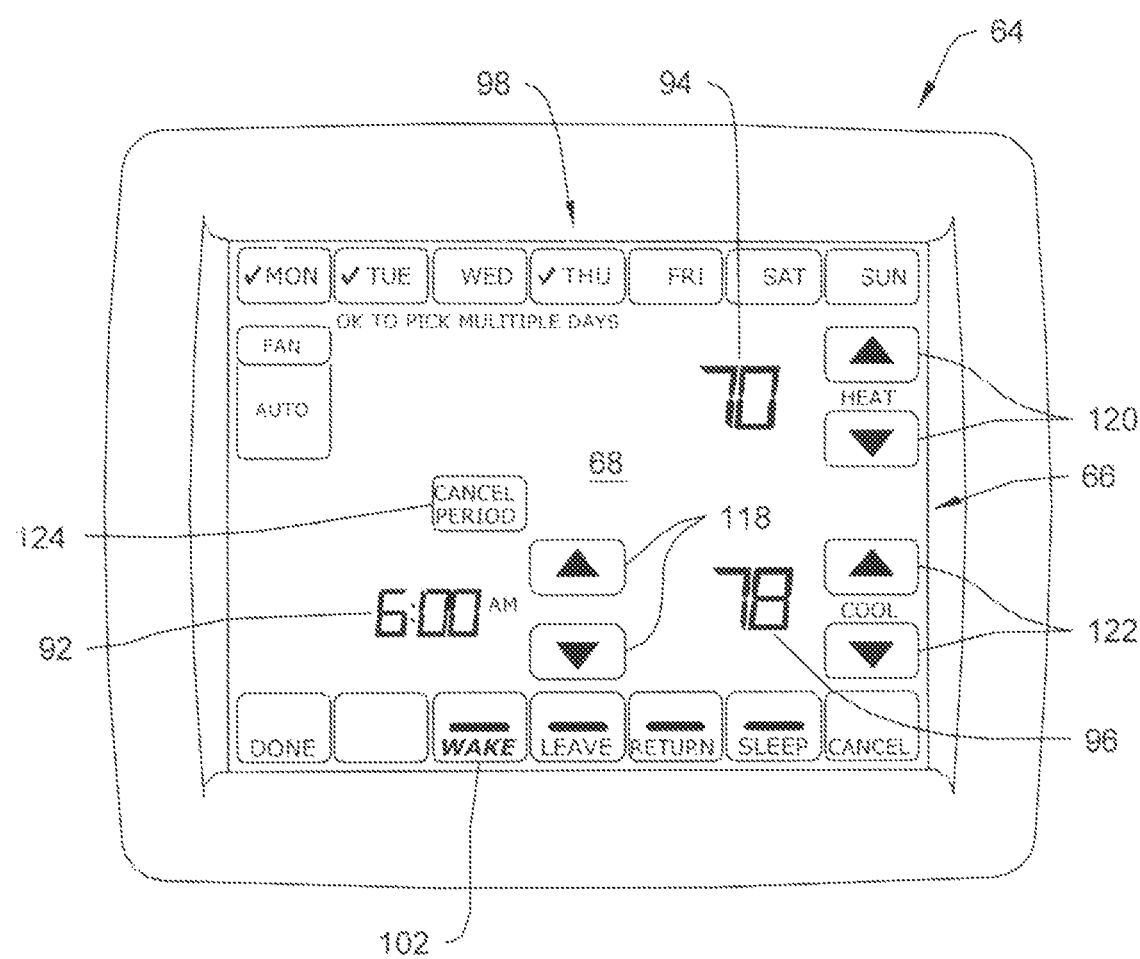

FIG. 6H is a pictorial view showing the selection of "MON", "TUE" and "THU" by pressing the corresponding buttons 98 on the touch screen 68. As shown in FIG. 6H, when at least one of the day buttons 98 is pressed, the controller 64 can be configured to display the event time parameter 92, heat set point parameter 94, and a cool set point parameter 96 for one of the periods in the schedule. A set of up/down buttons 118 can be utilized to modify the event time parameter 92 within the schedule to an earlier or later time, as desired. A similar set of up/down buttons 120,122 can be utilized to adjust, respectively, the heat set point parameter 94 and cool set point parameter 96 to a higher or lower temperature level, as desired, for the selected period.

The controller 64 can be configured to indicate the particular period the user is viewing on the touch screen 68 using an icon, blinking text or other indicator means. In FIG. 6H, for example, the text for the "WAKE" button 102 can configured to blink on and off (indicated generally by bolded text) to indicate that the user is currently viewing the settings for the "wake" period.

Figure 6I:
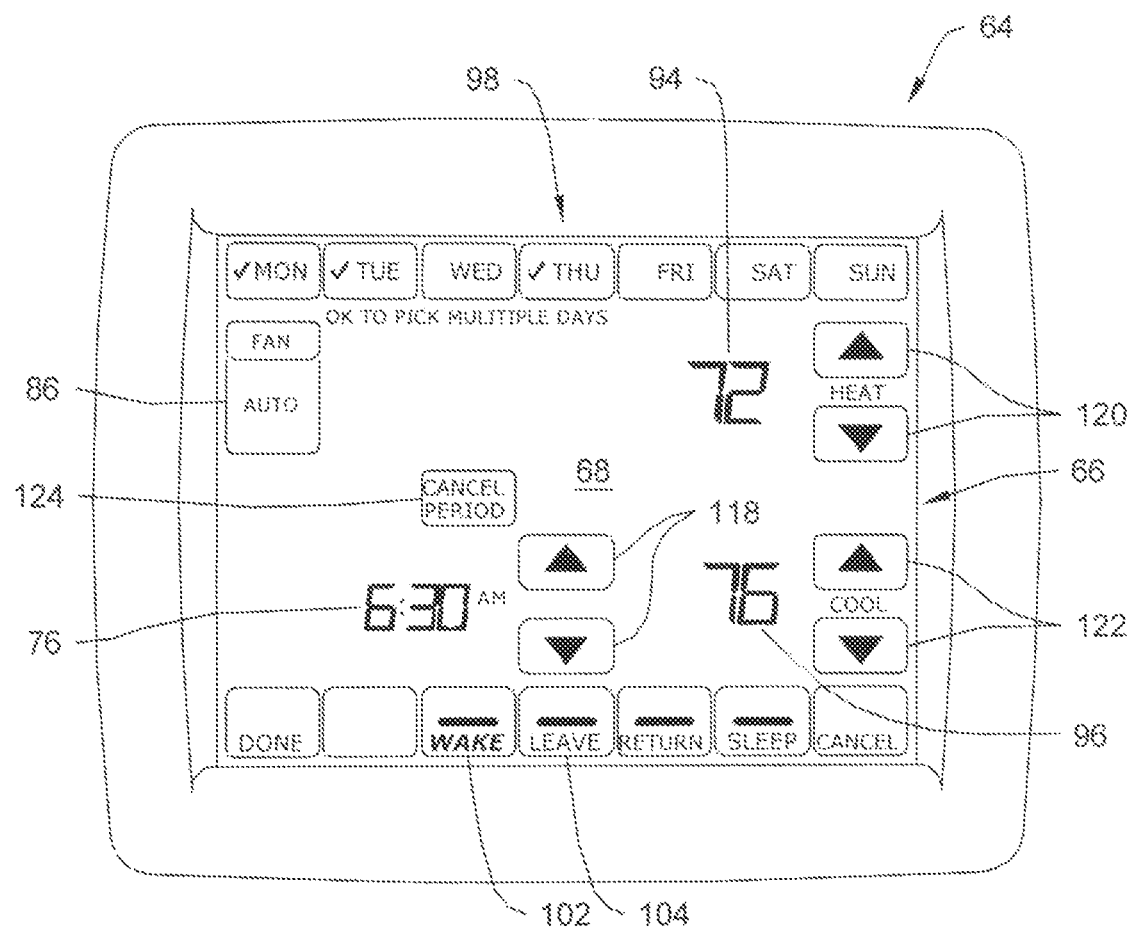

If the user desires to modify one or more of schedule parameters for the selected period, the user may use the appropriate set of up/down buttons 118,120,122 to modify the parameter. As shown in FIG. 6I, for example, the user can modify the event time parameter 92 from 6:00 AM to 6:30 AM using the set of up/down buttons 118 located adjacent the event time parameter 92. In similar fashion, the user may use the appropriate set of up/down buttons 120,122 to adjust the heat set point parameter 94 from 70° F. to 72° F., and the cool set point parameter 96 from 78° F. to 76° F. Also, the fan setting may be changed for the selected period using the fan mode button 86.

Figure 6J:
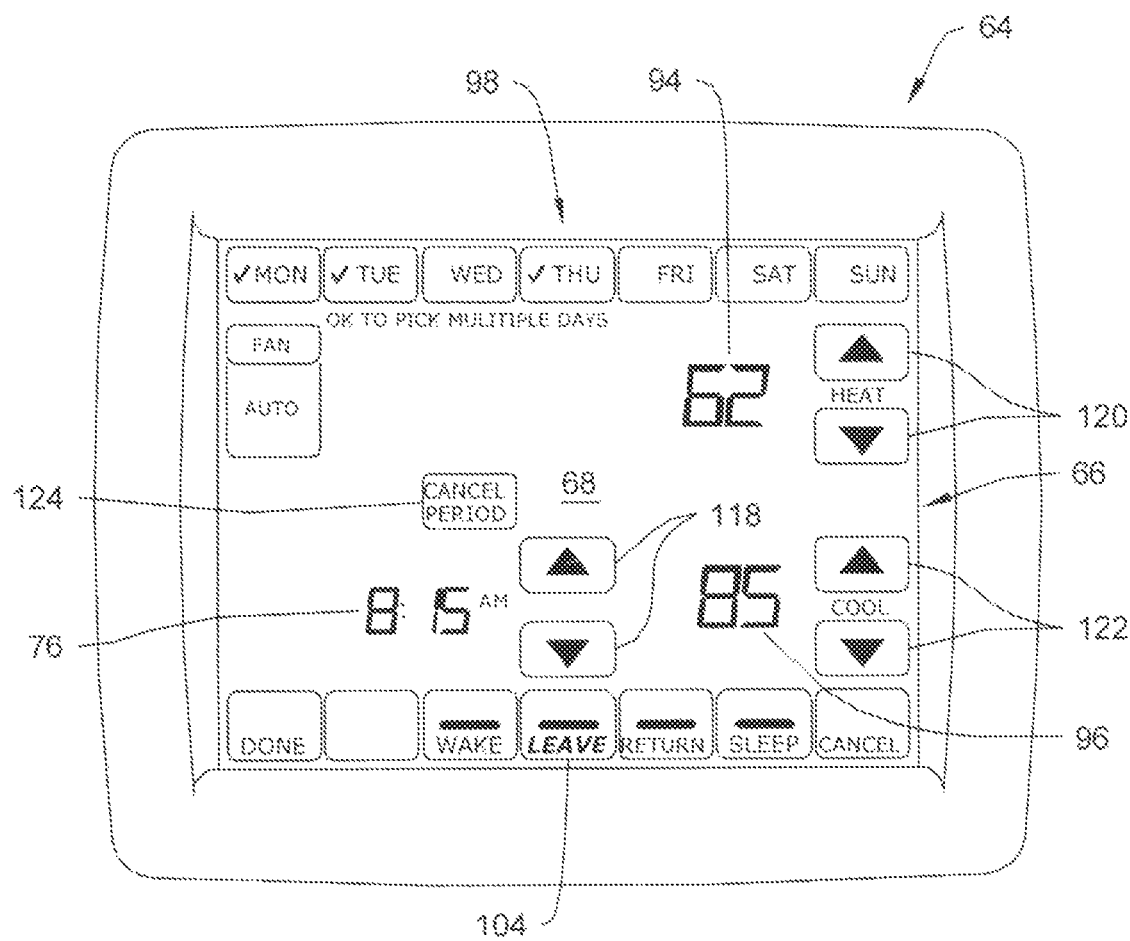

To display the parameters for the other periods, the user may press the appropriate period button on the bottom of the touch screen 68, causing the controller 64 to display the schedule parameters for that selected period. To display the settings for the "leave" period, for example, the user may press the "LEAVE" button 104 on the touch screen 68, causing the controller 64 to display the event time parameter 92, heat set point parameter 94, and cool set point parameter 96 for the "leave" period on the touch screen 68, as shown in FIG. 6J. Once selected, the appropriate set of up/down buttons 118,120,122 can be pressed to modify the scheduler parameters, as desired. As with the "WAKE" button 102 discussed above with respect to FIG. 6H, the "LEAVE" button 104 can include indicator means (e.g. blinking text) to indicate that that the user is currently viewing the settings for the "leave" period.

Figure 6K:
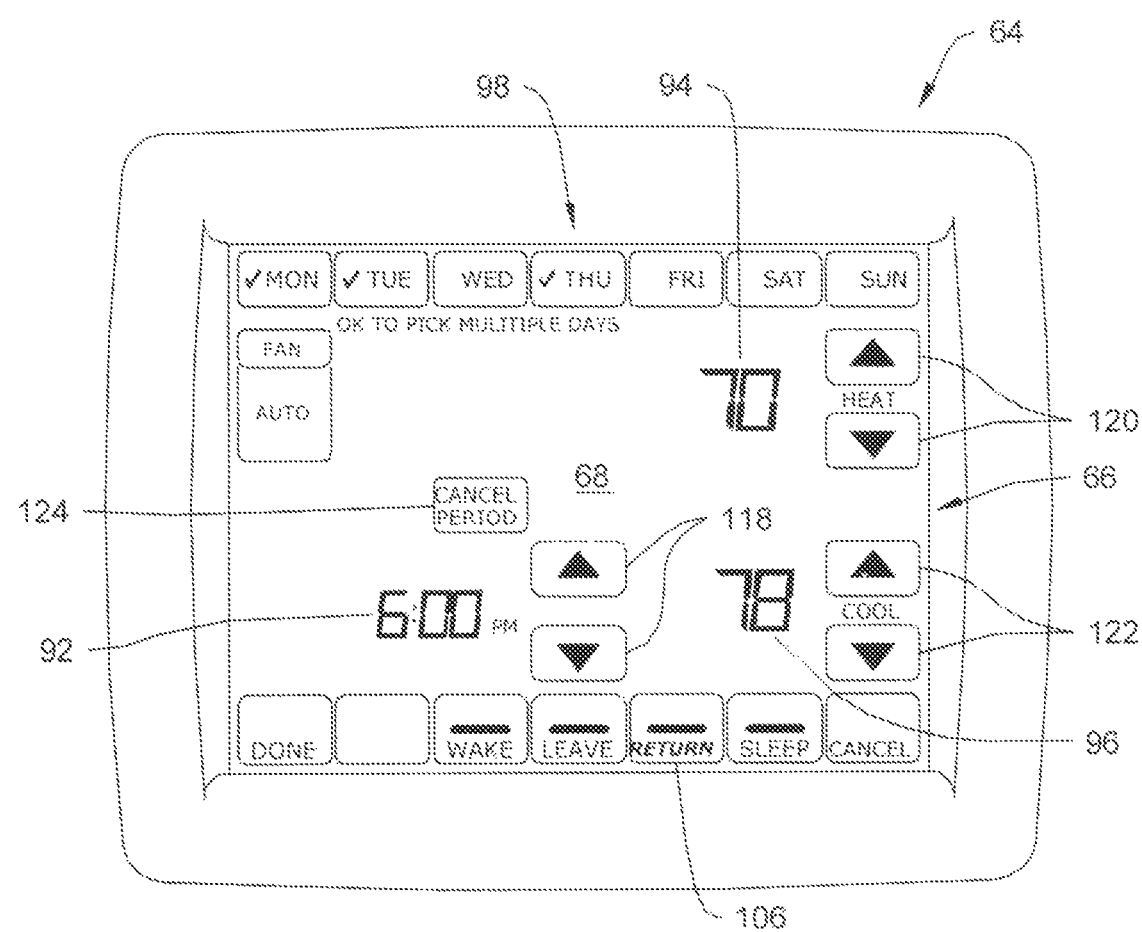
Figure 6L:
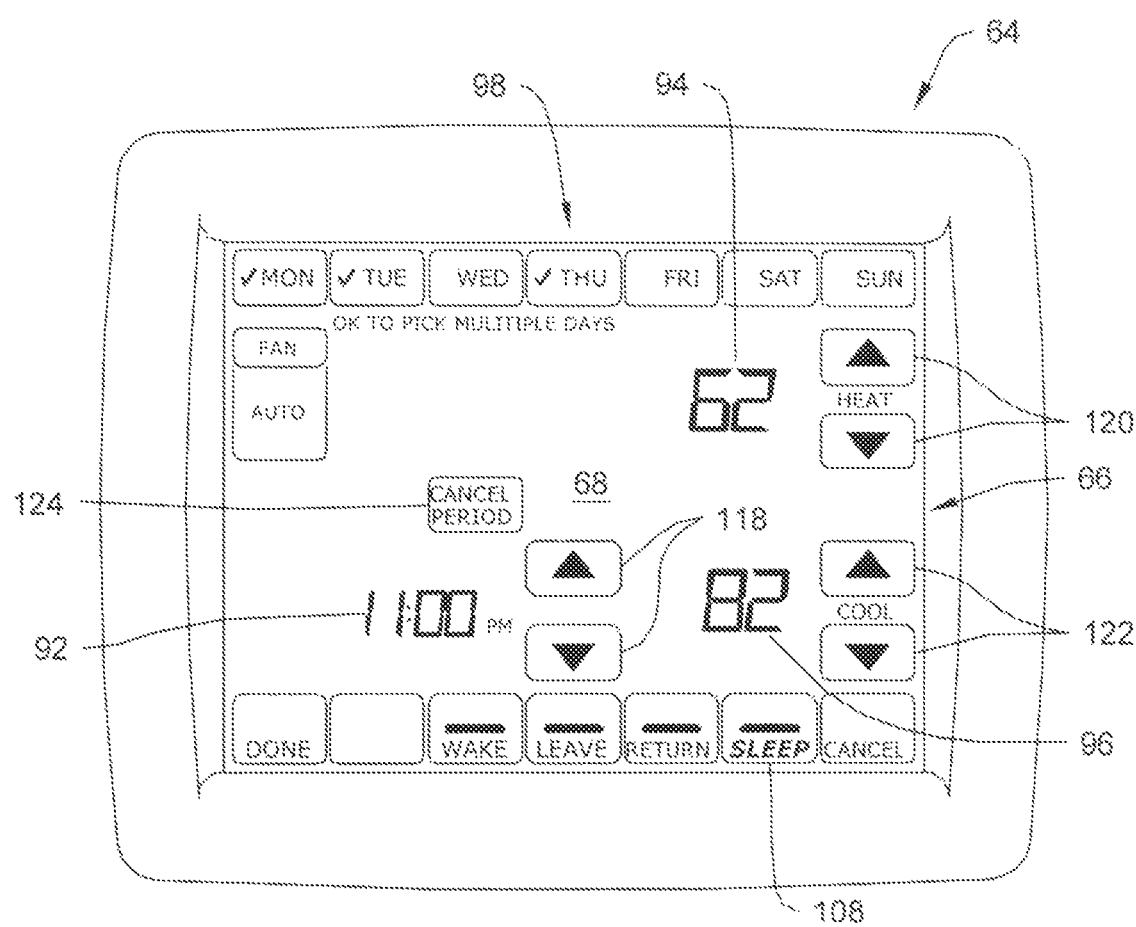

FIGS. 6K and 6L are pictorial views showing the schedule parameters corresponding, respectively, to the "return" and "sleep" periods of the schedule. In FIG. 6K, for example, the "RETURN" button 106 has been selected (indicated generally by bolded text), causing the controller 64 to display the event time parameter 92 (i.e. 6:00 PM), heat set point parameter 94 (i.e. 70° F.) and cool set point parameter 96 (i.e. 78° F.) on the touch screen 68. In similar fashion in FIG. 6L, the "SLEEP" button 108 has been selected, causing the controller 64 to display the event time parameter 92 (i.e. 11:00 PM), heat set point parameter 94 (i.e. 62° F.), and cool set point parameter 96 (i.e. 82° F.) for the "sleep" period on the touch screen 68. Once selected, the user may then adjust the schedule parameters using the appropriate set of up/down buttons 118,120,122 on the touch screen 68, as desired.

In the illustrative embodiment, the user may select or de-select one or more days at any point during the editing mode using the appropriate day button(s) 98 located on the touch screen 68. In the illustrative view of FIG. 6L, for example, the user may desire to add "Wednesday" to the list of days to run the modified schedule parameters. To do so, the user may press the "WED" button 98 on the touch screen 68, causing the controller 64 to add that day to the modified schedule. Conversely, if the user desires to remove one or more days from the modified schedule, the user may simply press the appropriate day button 98 on the touch screen 68, causing the controller 64 to remove those day(s) from the modified schedule.

Figure 6M:
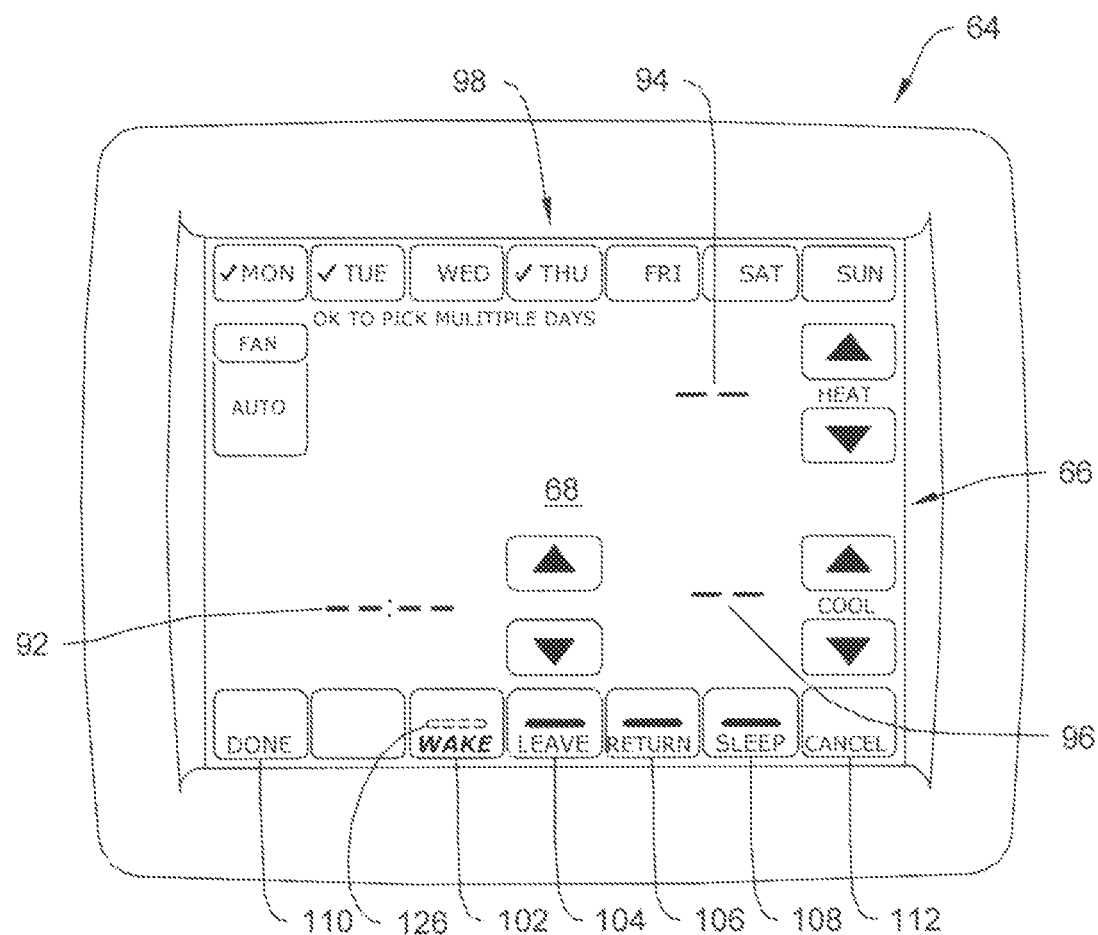

If the user desires to cancel a particular period from the schedule, the user can select the appropriate period button 102,104,106,108 and then press a "CANCEL PERIOD" button 124 on the touch screen 68. As shown in FIG. 6M, for example, when the user presses the "CANCEL PERIOD" button 124 while in the "wake" period, the controller 64 can be configured to cancel or zero-out the event time parameter 92, heat set point parameter 94, and/or cool set point parameter 96 for that period. An icon 126 normally situated above the "WAKE" button 102 can be configured to disappear on the touch screen 68, indicating to the user that the schedule parameters for that particular period have been cancelled. When the modified schedule is subsequently run, the controller 64 can be configured to apply the settings for the previous period towards the cancelled period until the next scheduled period occurs.

Figure 6N:
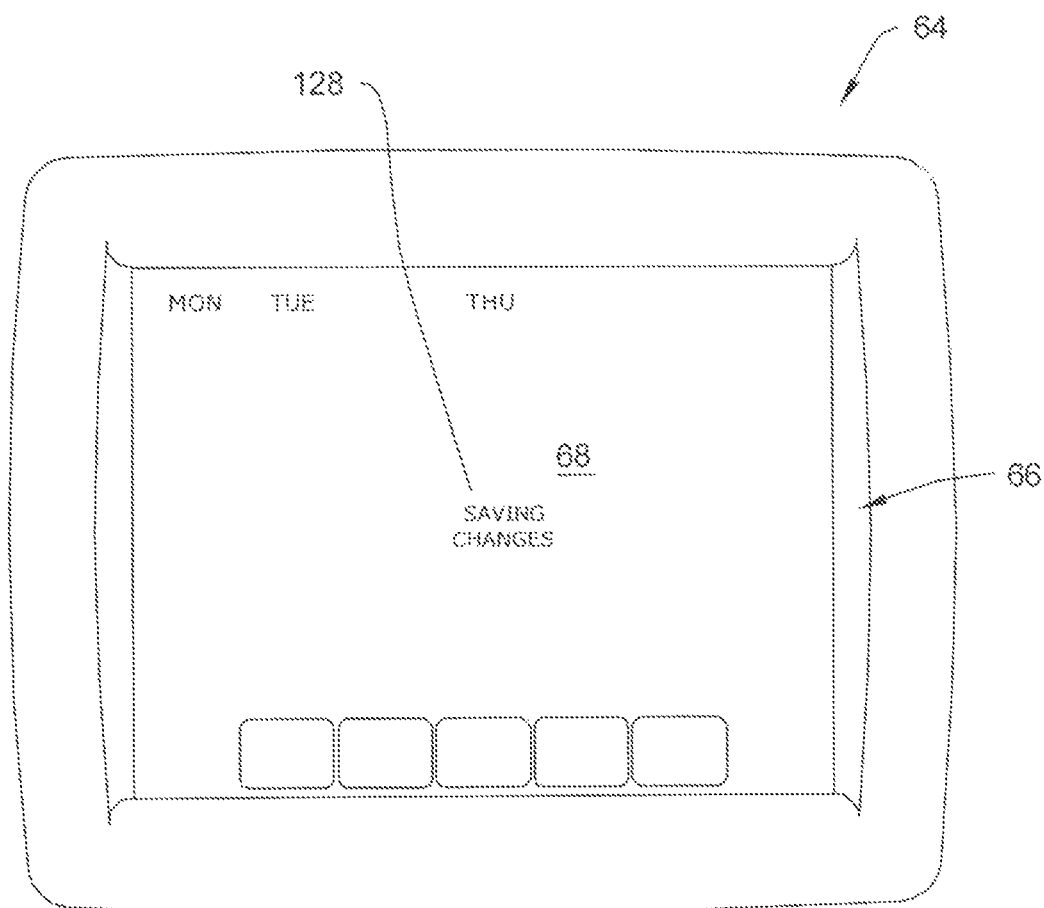

After the user has finished modifying the schedule, the user can press either the "DONE" button 110 to save the modified parameters in the schedule, or the "CANCEL" button 112 to discard the modified changes without saving. As shown in FIG. 6N, the controller 64 can be configured to temporarily display an alphanumeric message 128 such as "SAVING CHANGES" on the touch screen 68 at or near the time that the controller 64 saves the modified settings. The controller 64 can also be configured to temporarily display the days of the week on the touch screen 68 to confirm the selected days modified in the schedule. In some embodiments, the controller 64 can be configured to revert back to the main menu screen of FIG. 6A and, if desired, automatically run the modified schedule.

Figure 7:
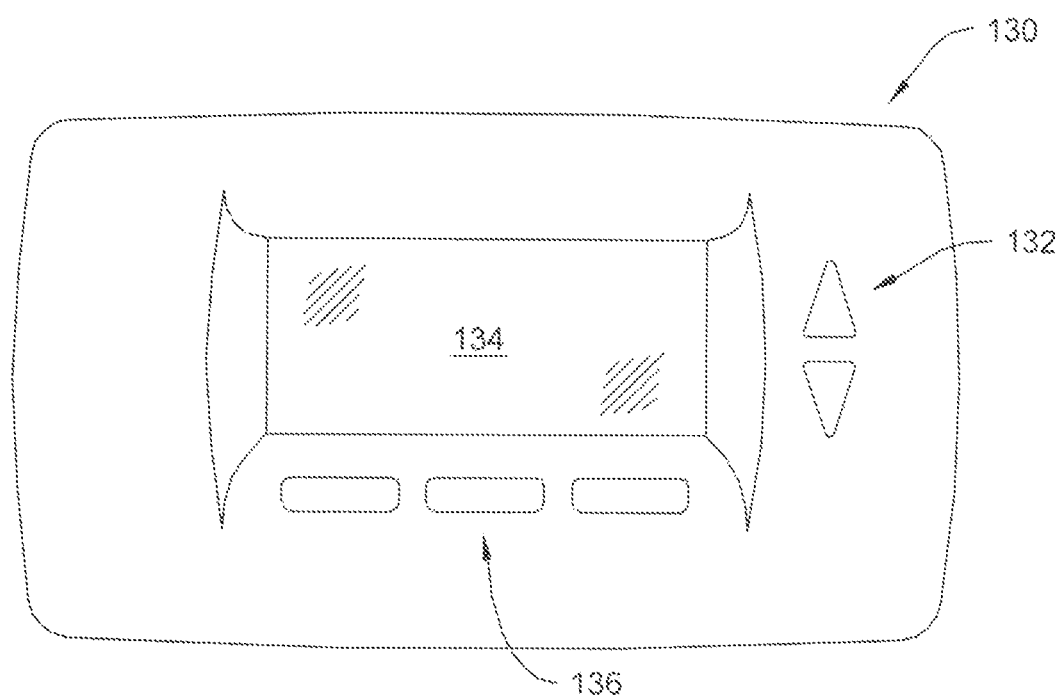
FIG. 7 is a plan view of another illustrative HVAC controller equipped with a display panel and keypad interface.

FIG. 7 is a plan view illustrating another exemplary HVAC controller 130 equipped with a user interface 132 having a separate schedule review mode. In the exemplary embodiment illustrated in FIG. 7, the user interface 132 includes a display panel 134 and keypad 136 equipped with a number of buttons that can be pressed by the user to scroll through various menus or screens displayable on the display panel 134. The display panel 134 can include any number of suitable display devices, including, for example, a backlit LCD panel or LED screen.

Figure 8A:
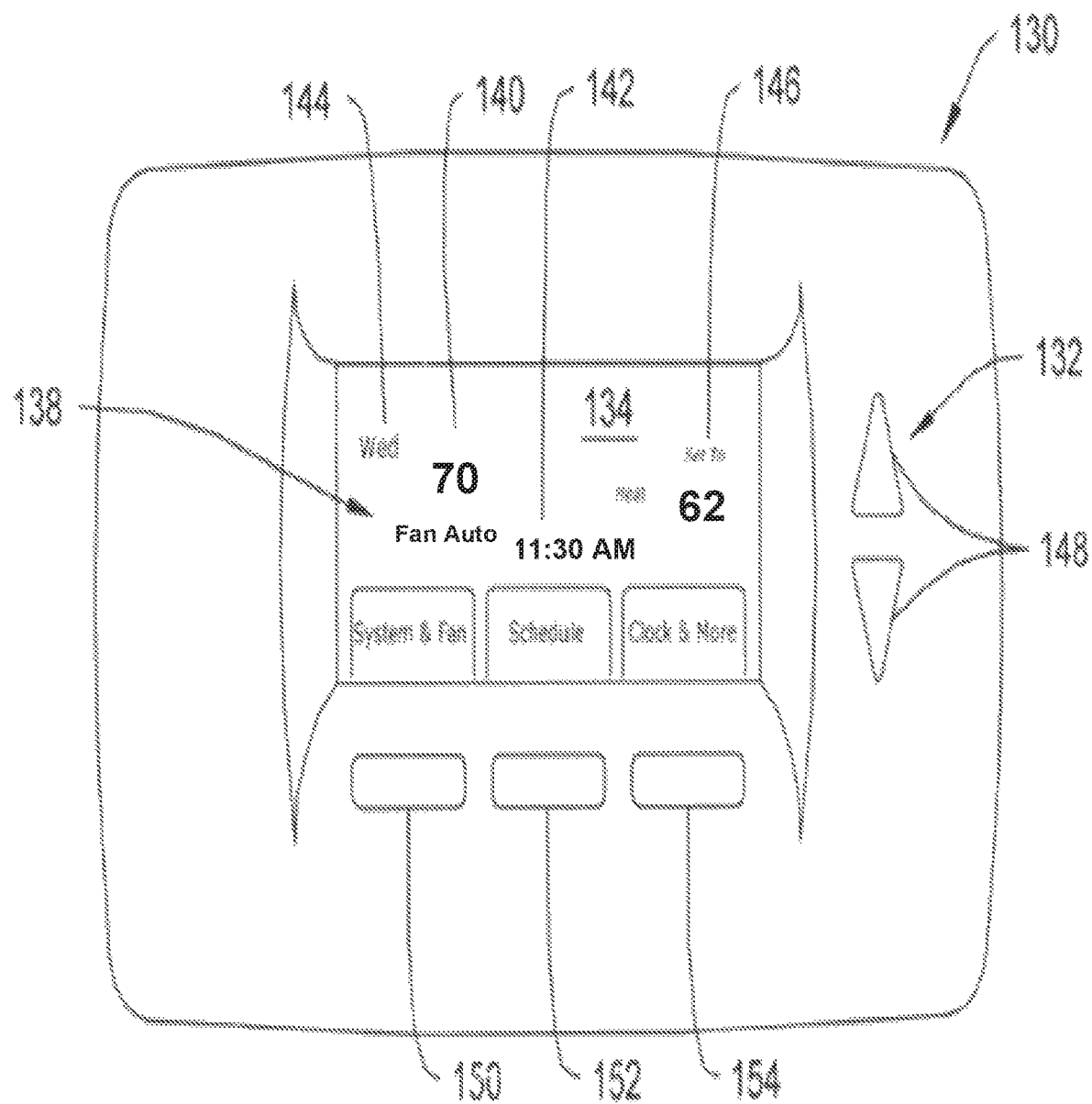
FIGS. 8A-8M are pictorial views showing an illustrative method of accessing and programming a schedule using the display panel and keypad interface of FIG. 7.

FIGS. 8A-8M illustrate pictorial views showing an illustrative method for accessing and programming a schedule using the controller 130 and user interface 132 of FIG. 7. In a first view depicted in FIG. 8A, the controller 130 can be configured to display a main menu screen 138 on the display panel 134, similar to that described above with respect to FIG. 6A. The controller 130, for example, can be configured to display a current inside temperature parameter 140 (in either ° F. or ° C.), a time of day parameter 142, and a day of week parameter 144. The controller 130 can also be configured to display the current set point parameter 146 on the display panel 134, indicating the temperature at which the controller 130 is currently set to maintain. A set of up/down buttons 148 on the keypad 136 can be used to scroll through the various schedule parameters displayed on the display panel 134. A second series of buttons 150,152,154 disposed below the display panel 134 can be utilized to navigate through one or more menus or screens displayable on the display panel 134.

Figure 8B:
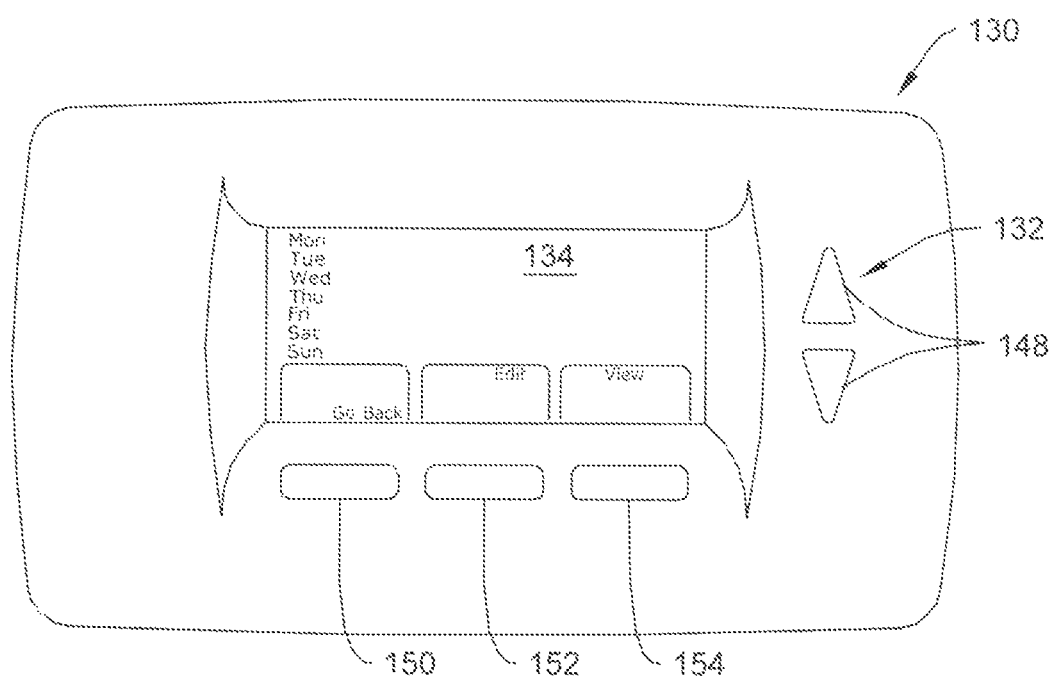

To initialize the scheduling routine within the controller 130, the user may press the button 152 located immediately below the text "SCHEDULE" located on the display panel 134. When pressed, the controller 130 can be configured to initiate a schedule review mode, causing the display panel 134 to display each day of the week, as shown in FIG. 8B. Using the up/down buttons 148, the user can scroll up or down between each day of the week. As each day is selected, the controller 130 can be configured to blink or otherwise indicate the day of the week that has been selected. The user can then press the button 150 located below the text "GO BACK" on the display panel 134 to go back to the previous screen (i.e. main screen 122), or buttons 152 or 154 to initiate, respectively, the editing and schedule review modes within the controller 130.

Figure 8C:
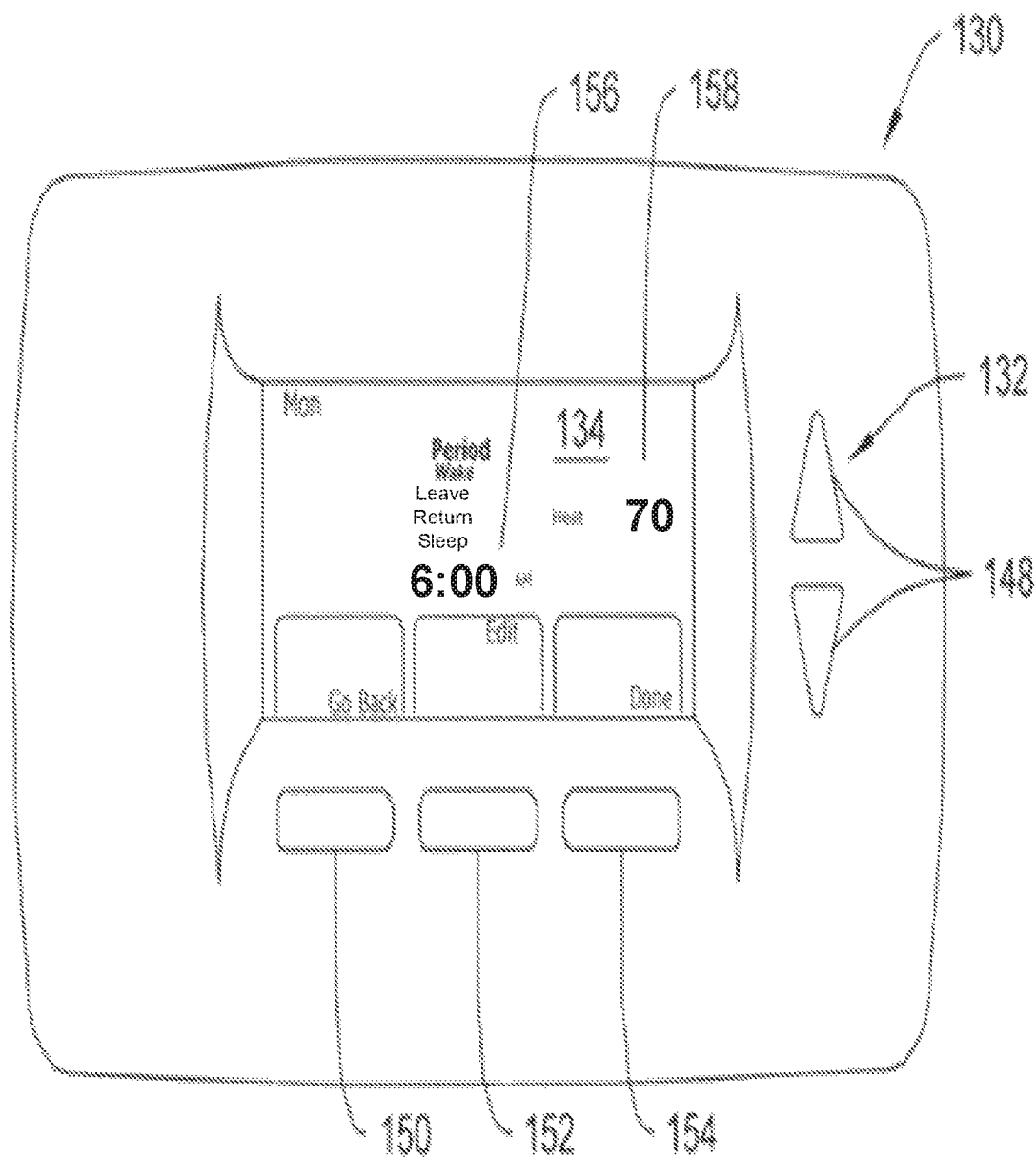

FIG. 8C is a pictorial view showing display panel 134 after "Monday" has been selected using the up/down buttons 148, and after button 154 has been pressed. As shown in FIG. 8C, the controller 130 can be configured to display the event time parameter 156 and heat/cool set point parameter 158 for each individual period in the schedule. In FIG. 8C, for example, the various schedule parameters for each period can displayed on the display panel 134 by repeatedly pressing the up/down buttons 148, causing the controller 130 to scroll through each individual period on the display panel 134.

Figure 8D:
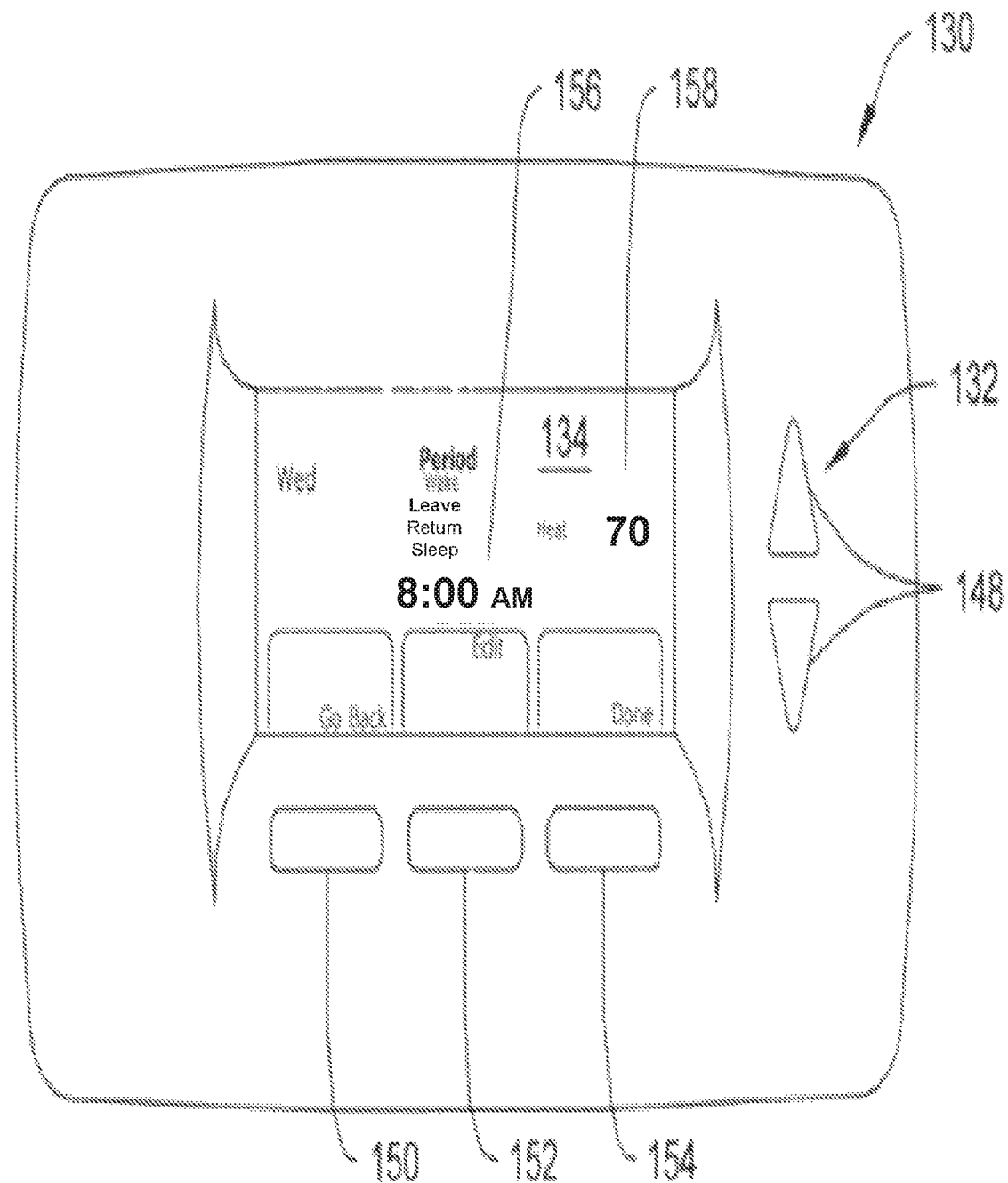
Figure 8E:
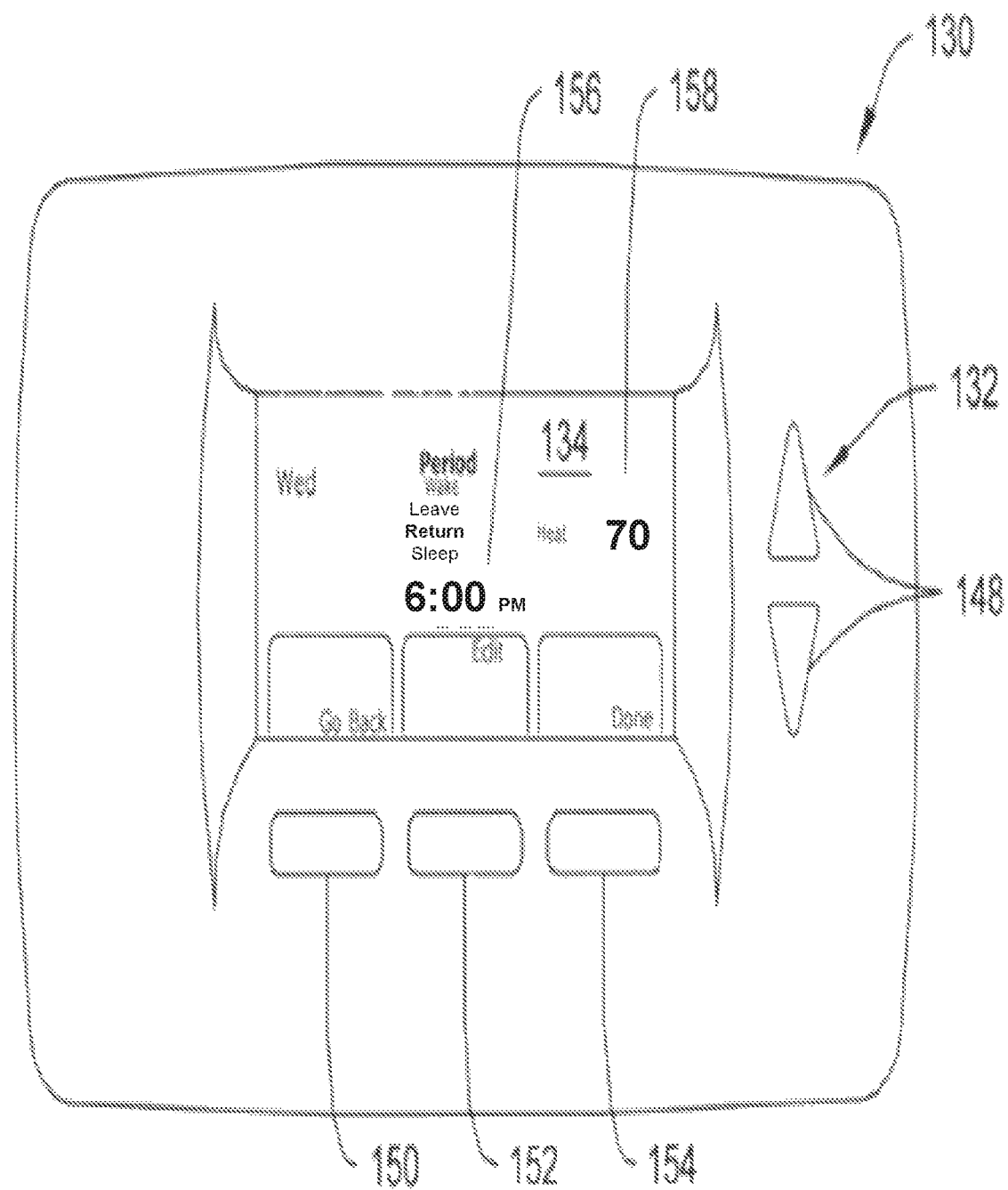
Figure 8F:
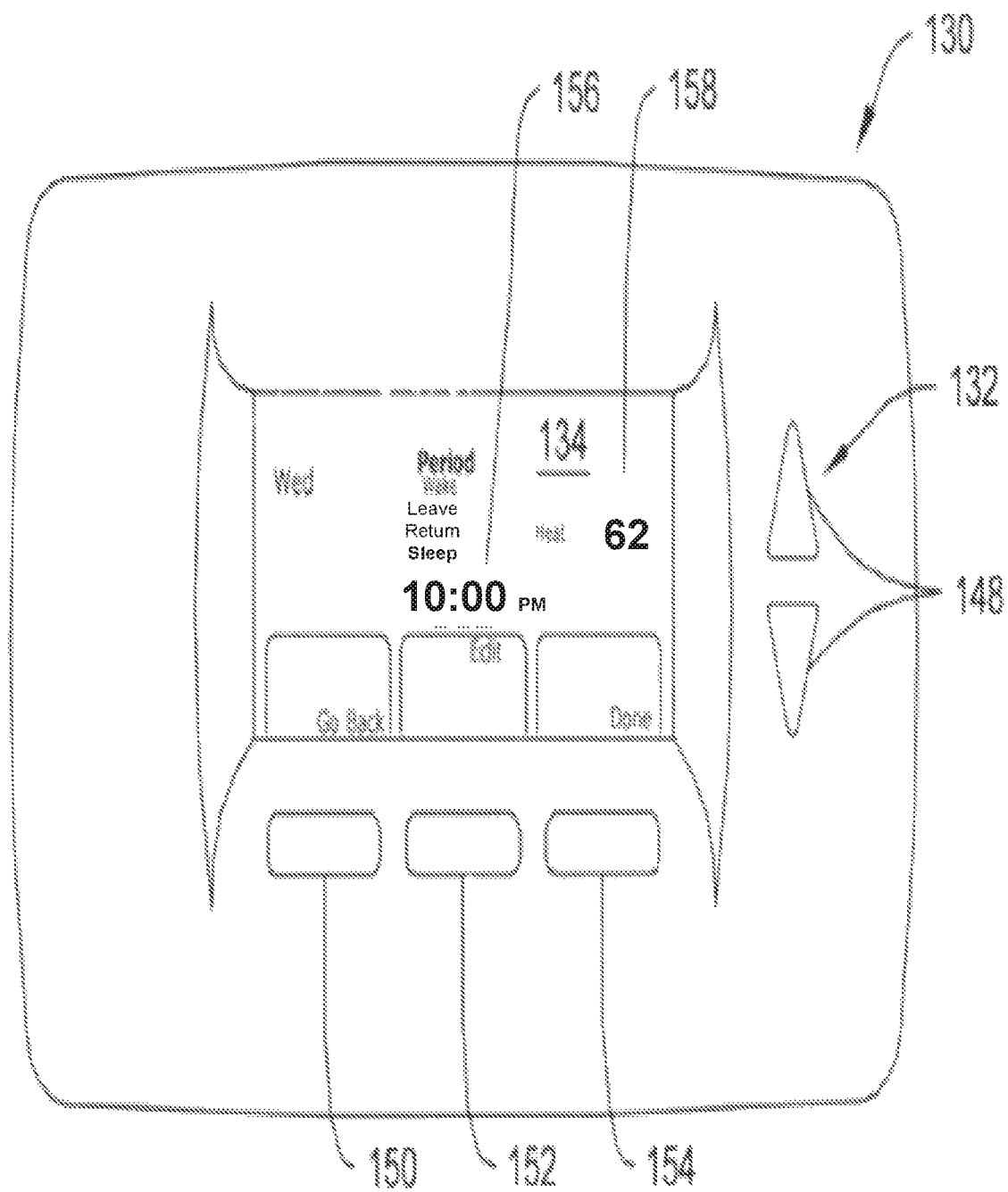

To view the schedule parameters for the other periods, the user may again use the up/down buttons 148, causing the controller 130 to access the schedule parameters for each period and display them on the display panel 134. For example, as can be seen in FIGS. 8D-8F, the user may cycle through the schedule parameters for the "leave" period (FIG. 8D), "return" period (FIG. 8E) and "sleep" period (FIG. 8F) to view the schedule parameters for those periods. At each screen, the controller 130 can be configured to notify the user which period is currently being viewed by blinking the text for the period (indicated generally by bolded text) on the display panel 134. When the user is finished viewing the schedule parameters for that particular day, the user may press either button 150 to go back to the previous screen, or button 154 to terminate the schedule review mode and return to the main screen 138 of FIG. 8A.

To modify one or more parameters in the schedule, the user can initiate an editing mode within the controller 130. The user can modify the schedule either individually on a day-by-day basis from within the schedule review mode, or directly via the screen illustrated in FIG. 8B by bypassing the schedule review mode.

Figure 8G:
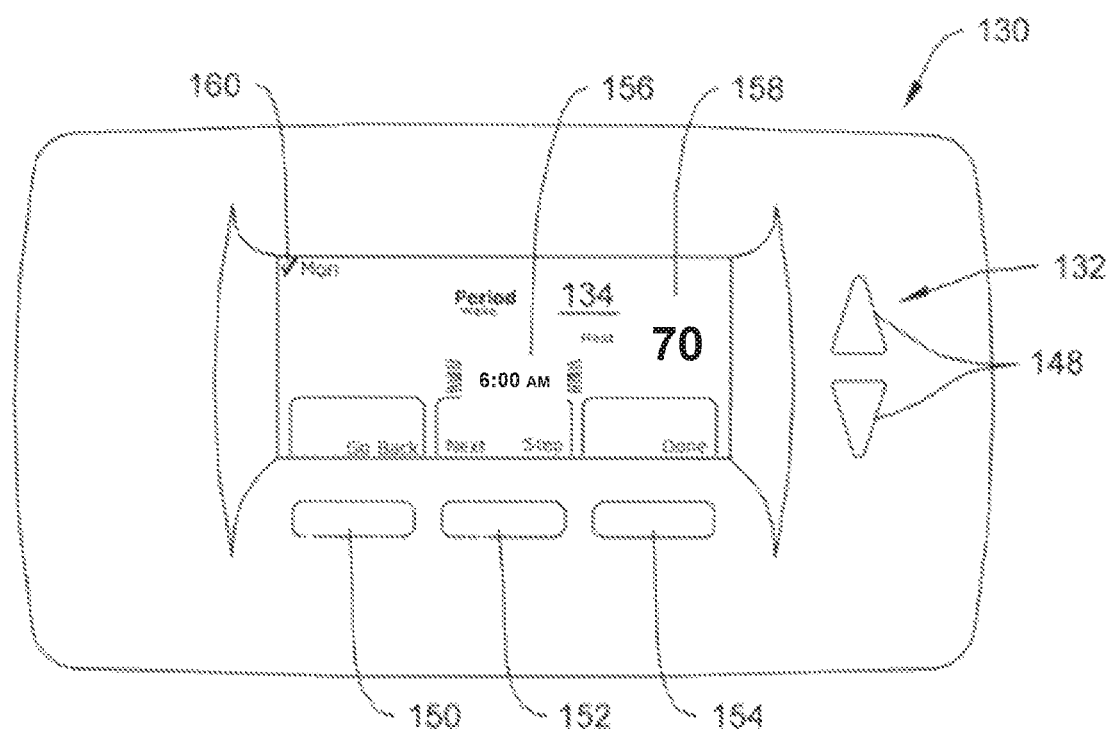

To edit the parameters on a day-by-day basis, the user, while within the schedule review mode, may select the individual day of the week to modify, and then press button 152 located below the text "Edit" located on the display panel 134 (see FIG. 8C). For the day "Monday" selected in FIG. 8C, for example, the user can press button 152 while viewing the various parameters for the wake period, causing the controller 130 to initiate the editing mode and display the parameters for that specific day, as shown in FIG. 8G. A check mark 160, blinking text, or other suitable indicator can be configured to appear on the display panel 134, indicating that the user has selected to modify the parameters for Monday.

The controller 130 can be configured to prompt the user to cycle through the various schedule parameters for each period by blinking the text for the selected schedule parameter on the display panel 134. For example, the event time parameter 156 in FIG. 8G can be configured to blink on and off, allowing the user to modify that particular parameter using the up/down buttons 148. The user may then change the event time parameter 156 to, for example, 6:30 AM by repeatedly pressing the appropriate one of the up/down buttons 148 until 6:30 AM appears on the display panel 134.

Figure 8H:
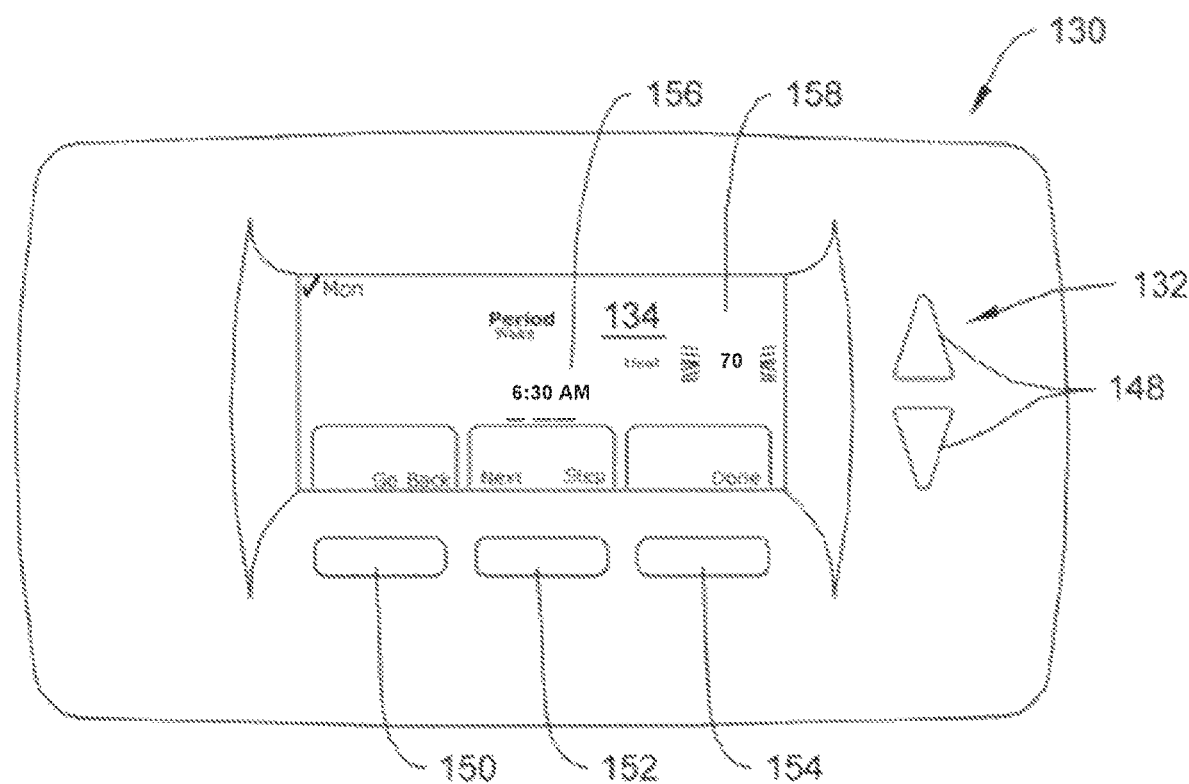
Figure 8I:
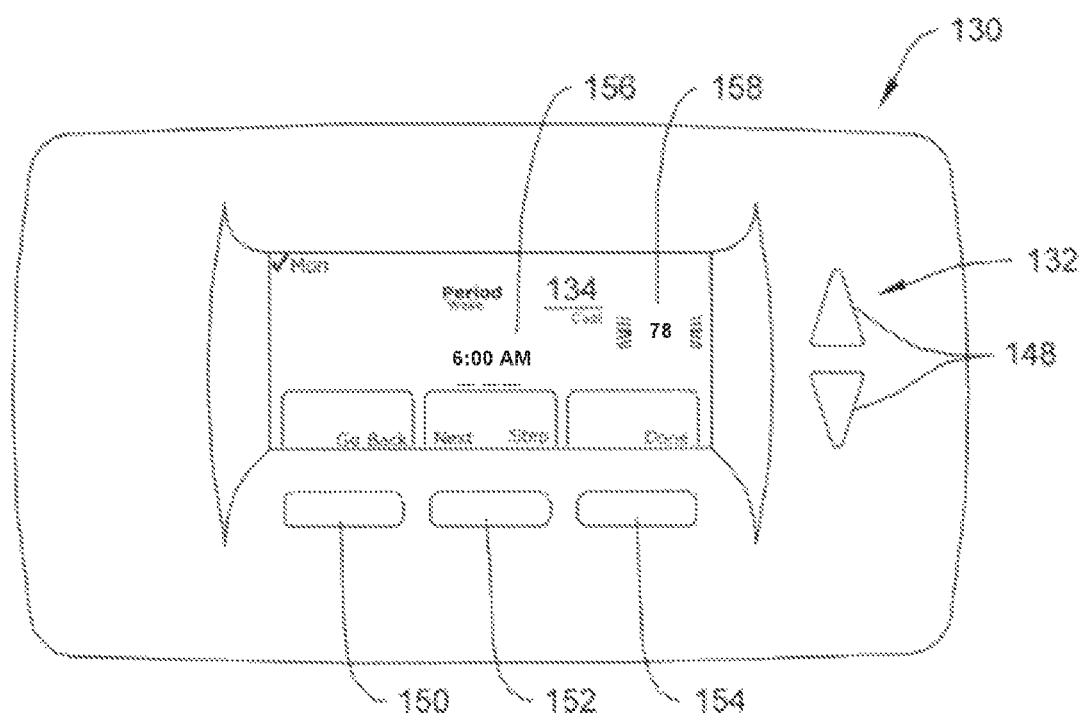

To change the other parameters for that selected period, the user can press button 152 located immediately below the text "Next Step" on the display panel 134, causing the controller 130 to cycle to the next schedule parameter in that period. As the user cycles through each schedule parameter, the controller 130 can be configured to blink the appropriate text on the display panel 134, as shown in FIGS. 8H-8I. When the user has cycled through each schedule parameter for the selected period, the user may press button 152 again, causing the controller 130 to cycle to the next period in the schedule. The process of selecting and modifying schedule parameters can then be repeated, as desired, until all of the parameters for each and every period have been selected. At any point during this process, the user can save the modified settings by pressing button 154 located under the text "Done" on the display panel 134, causing the controller 130 to save the modified schedule parameters.

Figure 8J:
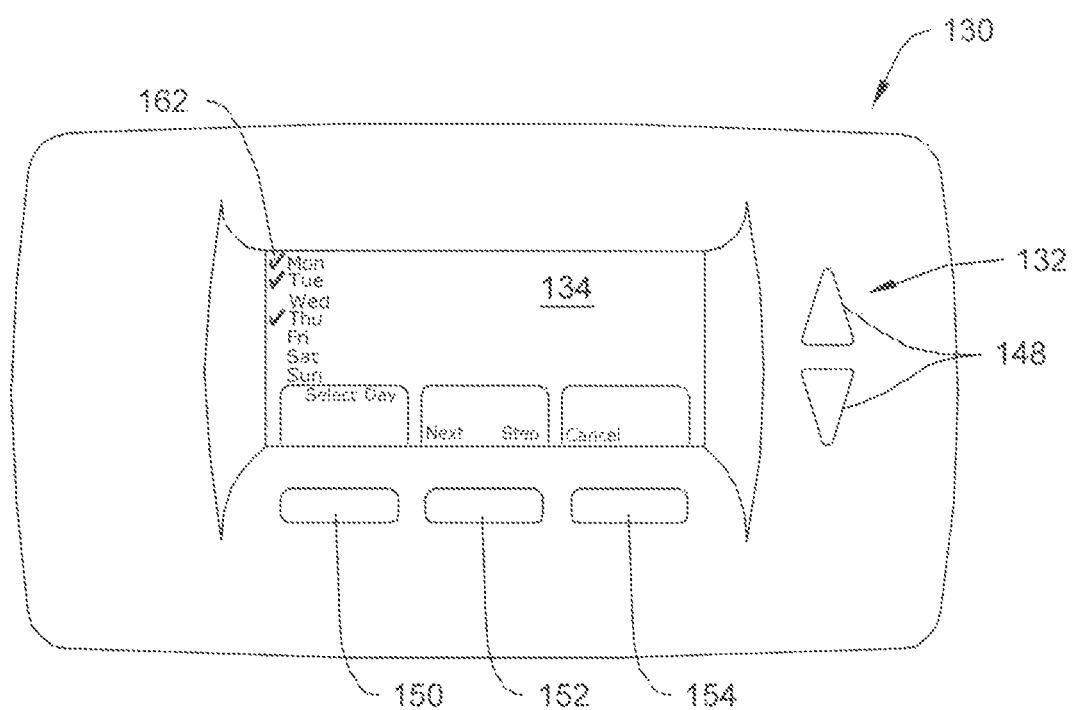

To select multiple days to program at once in the illustrative embodiment, the user can initiate the editing mode directly from the screen depicted in FIG. 8B by pressing button 152 located under the text "Edit" on the display panel 134. As shown in FIG. 8J, when button 152 is pressed, the controller 130 can be configured to display the text "Select Day" above button 150, prompting the user to select one or more days to modify. Using the up/down buttons 148 and the "select day" button 150, the user can scroll through each day of the week and, if desired, select individually each day of the week to modify in the schedule (e.g. Monday, Tuesday, and Thursday). A check mark 162, blinking text or other suitable indicator can be displayed on the display panel 134 next to each day selected, indicating those days of the week to be modified in the schedule.

Figure 8K:
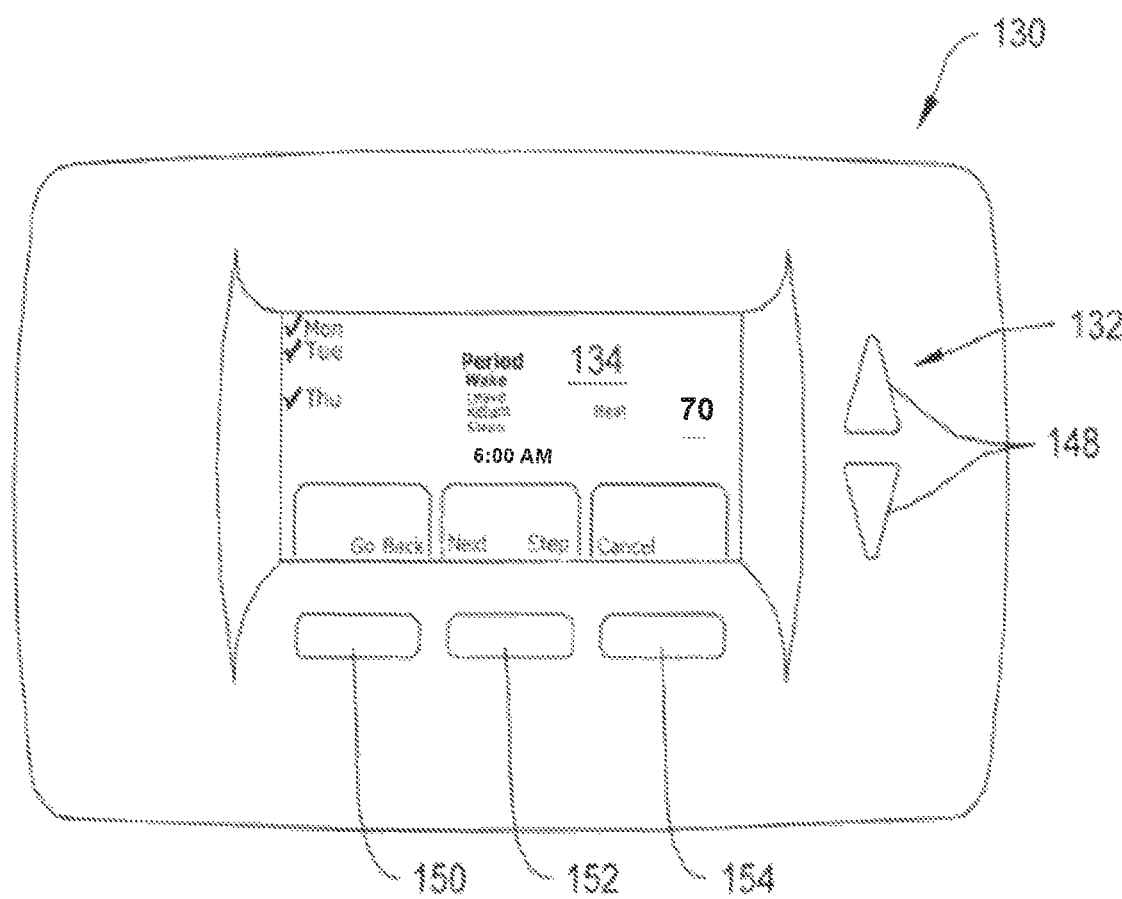
Figure 8L:
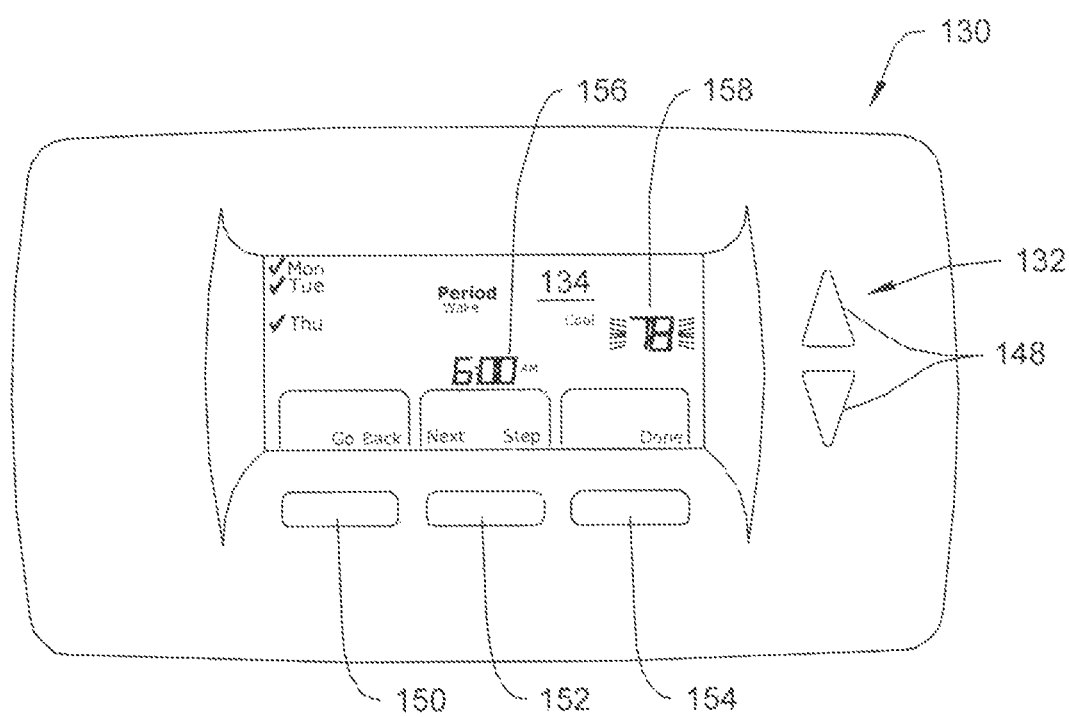

Once the user has selected the desired day or days to modify the schedule, the user can then press the "Next Step" button 152, causing the controller 130 to display the schedule parameters for one period. As shown in FIG. 8K, for example, the controller 130 can be configured to blink the text "Wake" on the display panel 134, indicating that the parameters for the "wake" period can be modified using the up/down buttons 148 and the "next/step" button 152, similar to that described above with respect to FIGS. 8G-8I. As shown in FIG. 8L, for example, the user can press button 152 repeatedly until the display panel 134 indicates (by bolded text) that the cool set point parameter 158 has been selected. Using the up/down buttons 148, the user can then modify the cool set point parameter 158 to a higher or lower value, as desired.

When the user has cycled through each of the parameters for a particular period, the user may press button 152 again, causing the controller 130 to cycle to the next period in the schedule. The process of selecting and modifying the parameters can then be repeated, as desired, until all of the parameters for each period have been selected and modified (if desired). At any point during this process, the user can save the modified settings by pressing button 154 located under the text "Done" on the display panel 134, causing the controller 130 to save the modified schedule parameters.

Figure 8M:
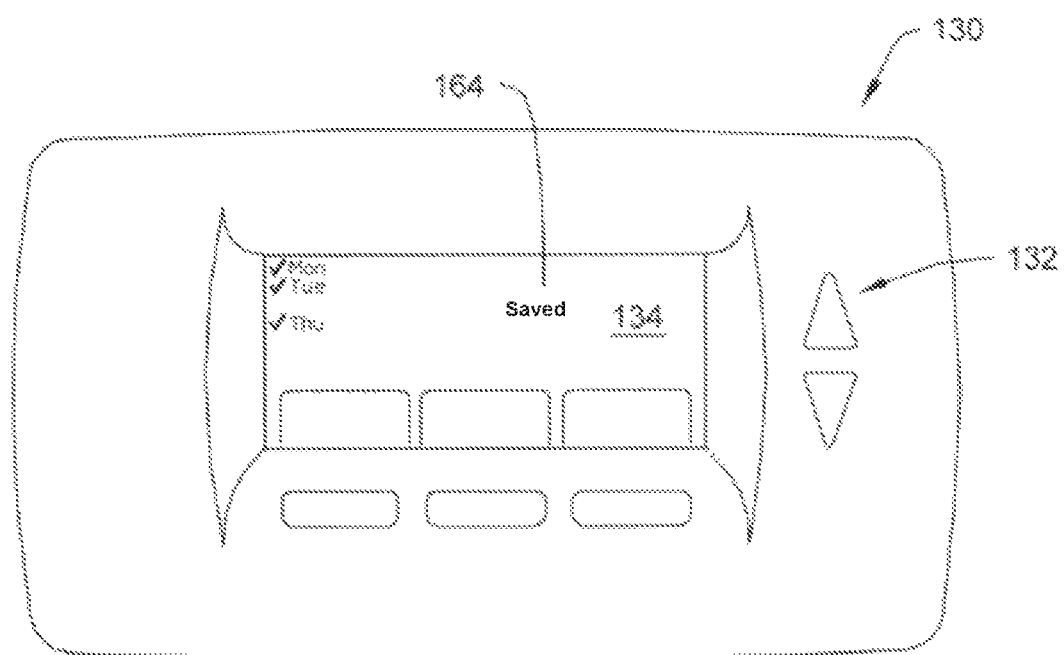

As shown in FIG. 8M, the controller 130 can be configured to temporarily display an alphanumeric message 164 such as "SAVED" on the display panel 134 at or near the time that the controller 130 saves the modified settings. The controller 130 can also be configured to temporarily display the days of the week on the display panel 134 to confirm to the user the particular days of the week modified in the schedule. In some embodiments, the controller 130 can revert back to the main menu screen 138 of FIG. 8A, and, if desired, automatically run the modified schedule.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. An HVAC controller for controlling one or more HVAC components, the HVAC controller comprising:
   a touch screen display;
   a memory for storing a programmable schedule, the programmable schedule;
   a controller coupled to the touch screen display and the memory, the controller configured to:
   display a home screen;
   in response to a first predefined user interaction with the touch screen, enter a schedule review mode that is separate from the home screen, wherein while in the schedule review mode, a user is permitted to view the entire programmable schedule via the touch screen display but is not permitting to edit the programmable schedule;
   in response to a second predefined user interaction with the touch screen, enter a schedule editing mode, wherein while in the schedule editing mode, the user is permitted to view the entire programmable schedule via the touch screen display and is permitted to edit the programmable schedule;
   control the one or more HVAC components in accordance with the programmable schedule; and
   in response to a third predefined user interaction with the touch screen, enter a temporary over-ride mode that allows the user to temporarily override the programmable schedule for a temporary period of time, wherein the temporary over-ride does not change the programmable schedule, the controller is configured to automatically return to controlling the one or more HVAC components in accordance with the programmable schedule after the temporary over-ride expires.

2. The HVAC controller of claim 1, wherein the controller is configured to save edits that are made to the programmable schedule while in the schedule editing mode to the memory, and displays an indication on the touch screen display that the edits are saved.

3. The HVAC controller of claim 1, wherein while in the schedule review mode, the controller is configured to display only part of the programmable schedule on the touch screen display at any given time, and wherein the controller is configured to accept inputs from the user via the touch screen display to display other parts of the programmable schedule on the display.

4. The HVAC controller of claim 1, wherein the schedule editing mode is entered from within the schedule review mode.

5. The HVAC controller of claim 1, wherein said programmable schedule includes at least two days, wherein each of the at least two days includes at least two time periods with one or more programmable schedule parameters corresponding to each of the at least two time periods.

6. The HVAC controller of claim 4, wherein while in the schedule editing mode, the controller is configured to allow a user to select two or more days of the programmable schedule by touching each of two or more day selection touch regions on the touch screen display so that edits to the programmable schedule can be applied to each of the selected days.

7. The HVAC controller of claim 6, wherein while in the schedule editing mode, the controller is configured to display one or more programmable schedule parameters of at least one time period for the two or more selected days of the programmable schedule.

8. The HVAC controller of claim 6, wherein while in the schedule editing mode, the controller is configured to allow a user to select a first time period, and to then make edits to one or more of the programmable schedule parameters that correspond to the first time period for the two or more selected days.

9. The HVAC controller of claim 8, wherein while in the schedule editing mode, the controller is configured to allow a user to select a second time period, and to then make edits to one or more of the programmable schedule parameters that correspond to the second time period for the two or more selected days.

10. The HVAC controller of claim 1, wherein the programmable schedule includes a heating schedule and a cooling schedule.

11. The HVAC controller of claim 1, wherein the HVAC controller is a thermostat that includes local temperature sensor coupled to the controller.

12. A method of accessing and programming a programmable schedule on an HVAC controller equipped with a user interface, comprising:
   in response to a first predefined user interaction with the user interface of the HVAC controller, entering a schedule review mode, wherein while in the schedule review mode, a user is permitted to view the entire programmable schedule via the touch screen display but is not permitting to edit the programmable schedule;
   in response to a second predefined user interaction with the user interface of the HVAC controller, entering a schedule editing mode, wherein while in the schedule editing mode, the user is permitted to view the entire programmable schedule via the touch screen display and is permitted to edit the programmable schedule;
   controlling one or more HVAC components in accordance with the programmable schedule;
   in response to a third predefined user interaction with the user interface of the HVAC controller, entering a temporary over-ride mode that allows the user to temporarily override the programmable schedule for a temporary period of time, wherein the temporary over-ride does not change the programmable schedule; and
   automatically returning to controlling the one or more HVAC components in accordance with the programmable schedule after the temporary override expires.

13. The method of claim 12 further comprising displaying a home screen.

14. The method of claim 12, wherein the schedule editing mode is entered from within the schedule review mode.

15. The method of claim 12, wherein the schedule review mode is exited before the schedule editing mode is entered.

* * * * *